US010630738B1

(12) United States Patent
Vendrow et al.

(10) Patent No.: US 10,630,738 B1
(45) Date of Patent: Apr. 21, 2020

(54) METHOD AND SYSTEM FOR SHARING ANNOTATED CONFERENCING CONTENT AMONG CONFERENCE PARTICIPANTS

(71) Applicant: RingCentral, Inc., Belmont, CA (US)

(72) Inventors: Vlad Vendrow, Reno, NV (US); Aleksei Petrov, Redwood City, CA (US); Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/146,682

(22) Filed: Sep. 28, 2018

(51) Int. Cl.
*H04L 29/06* (2006.01)
*G06F 17/24* (2006.01)
*G06F 16/48* (2019.01)
*G06F 16/432* (2019.01)

(52) U.S. Cl.
CPC ........ *H04L 65/4015* (2013.01); *G06F 16/433* (2019.01); *G06F 16/48* (2019.01); *G06F 17/241* (2013.01)

(58) Field of Classification Search
CPC ........ G06F 17/241; G06F 17/00; G06F 3/048; G06F 3/00; G06F 16/00; H04L 65/00; H04L 9/00; H04N 21/00
See application file for complete search history.

(56) References Cited

U.S. PATENT DOCUMENTS

| | | | |
|---|---|---|---|
| 8,886,011 B2 * | 11/2014 | Chou | H04N 5/91 386/246 |
| 9,225,936 B2 | 12/2015 | Bastide et al. | |
| 9,342,516 B2 | 5/2016 | Matthews, III et al. | |
| 2002/0099552 A1 * | 7/2002 | Rubin | G09F 27/00 704/270 |
| 2004/0236830 A1 * | 11/2004 | Nelson | H04L 29/06027 709/204 |
| 2007/0260627 A1 * | 11/2007 | Knittel | G06Q 30/02 |
| 2008/0066185 A1 * | 3/2008 | Lester | G06F 21/10 726/27 |
| 2008/0281592 A1 * | 11/2008 | McKoen | G10L 15/265 704/235 |
| 2010/0251386 A1 * | 9/2010 | Gilzean | G06F 21/10 726/28 |
| 2012/0023103 A1 * | 1/2012 | Soderberg | G06F 16/58 707/739 |
| 2013/0311177 A1 * | 11/2013 | Bastide | H04L 12/1827 704/235 |
| 2014/0012614 A1 * | 1/2014 | Beresford-Wood | G06Q 40/12 705/7.15 |

(Continued)

*Primary Examiner* — Hugo Molina
(74) *Attorney, Agent, or Firm* — Finnegan, Henderson, Farabow, Garrett & Dunner, LLP

(57) ABSTRACT

Shared conferencing content may be annotated during presentation either by a presenter or by a participant of a conference. The annotated content may be manipulated by a participant or by a presenter through a user interface. A system for annotating shared conferencing content may be configured to receive, in real time, an annotation for a portion of multimedia content. The annotated portions of the multimedia content may have a set of associated characteristics for manipulating the portions of the multimedia content. A multimedia conferencing method may include permitting, in response to a received request, manipulation of the annotated portions of the multimedia content based on the set of the associated characteristics.

20 Claims, 14 Drawing Sheets

(56) References Cited

U.S. PATENT DOCUMENTS

| | | | | |
|---|---|---|---|---|
| 2014/0150059 A1* | 5/2014 | Uchida | .................. | H04L 63/08 |
| | | | | 726/3 |
| 2014/0325557 A1* | 10/2014 | Evans | ................ | H04N 21/4788 |
| | | | | 725/34 |
| 2015/0378995 A1* | 12/2015 | Brown | ................ | H04L 12/1827 |
| | | | | 707/608 |
| 2016/0147399 A1* | 5/2016 | Berajawala | ........... | G06F 17/241 |
| | | | | 715/753 |
| 2018/0027206 A1* | 1/2018 | Li | ..................... | H04N 5/23293 |
| | | | | 348/333.02 |

* cited by examiner

METHOD AND SYSTEM FOR SHARING ANNOTATED CONFERENCING CONTENT AMONG CONFERENCE PARTICIPANTS

TECHNICAL FIELD

The present disclosure generally relates to the field of conferencing systems and, more particularly, methods and systems for annotating shared conferencing content.

BACKGROUND

Effective sharing of ideas during a presentation allows participants to provide feedback to a presenter, encourages participants to express new ideas, and motivates participants to discuss presentation topics and questions. One of the ways to increase audience engagement is to annotate a presentation while a presenter explains the key concepts of the presentation. Annotating a presentation may include highlighting the key concepts and topics, sketching explanations on slide margins, and utilizing dynamic effects during the presentation. While dynamic effects such as transitions in Microsoft PowerPoint slides are well known, these effects are frequently preset and cannot be easily implemented for presenting mixed media content.

SUMMARY

Aspects of the disclosure provide a method and a system for annotating shared conferencing content. The shared conferencing content may be annotated during the presentation either by a presenter, by a participant of a conference, or automatically, by a conferencing application. The annotated content may be manipulated by the participant or by the presenter through the user interface.

In one aspect, a multimedia conferencing method is provided for receiving, in real time, an annotation for a portion of multimedia content. The annotated portions of the multimedia content may have a set of associated characteristics for manipulating the portions of the multimedia content. The multimedia conferencing method may allow, in response to a received request, manipulation of the annotated portions of the multimedia content based on the set of the associated characteristics In another aspect, a multimedia conferencing system including a memory device storing instructions and a processor configured to annotate a portion of multimedia content is provided. The annotated portion of the multimedia content may have a set of associated characteristics for manipulating the portion of the multimedia content. The multimedia conferencing system may be configured to manipulate the annotated portions of the multimedia content based on the set of the associated characteristics.

In yet another aspect, a multimedia conferencing system is provided, the multimedia conferencing system including a memory device storing instructions and a processor configured to execute the instructions to perform a method, the method including receiving, in real time, annotations for portions of multimedia content and communicating to a participant device the multimedia content including the annotations through a network connection. The method may also include manipulating the annotated portions of the multimedia content through a user interface of a participant device based on a set of associated characteristics.

Additional features and advantages of the disclosed example embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are explanatory examples only and are not restrictive of the disclosed embodiments as claimed.

BRIEF DESCRIPTION OF THE DRAWINGS

The accompanying drawings constitute a part of this description. The drawings illustrate several example embodiments of the present disclosure and, together with the description, serve to explain the principles of the disclosed embodiments as set forth in the accompanying claims:

DETAILED DESCRIPTION

Figure 1:
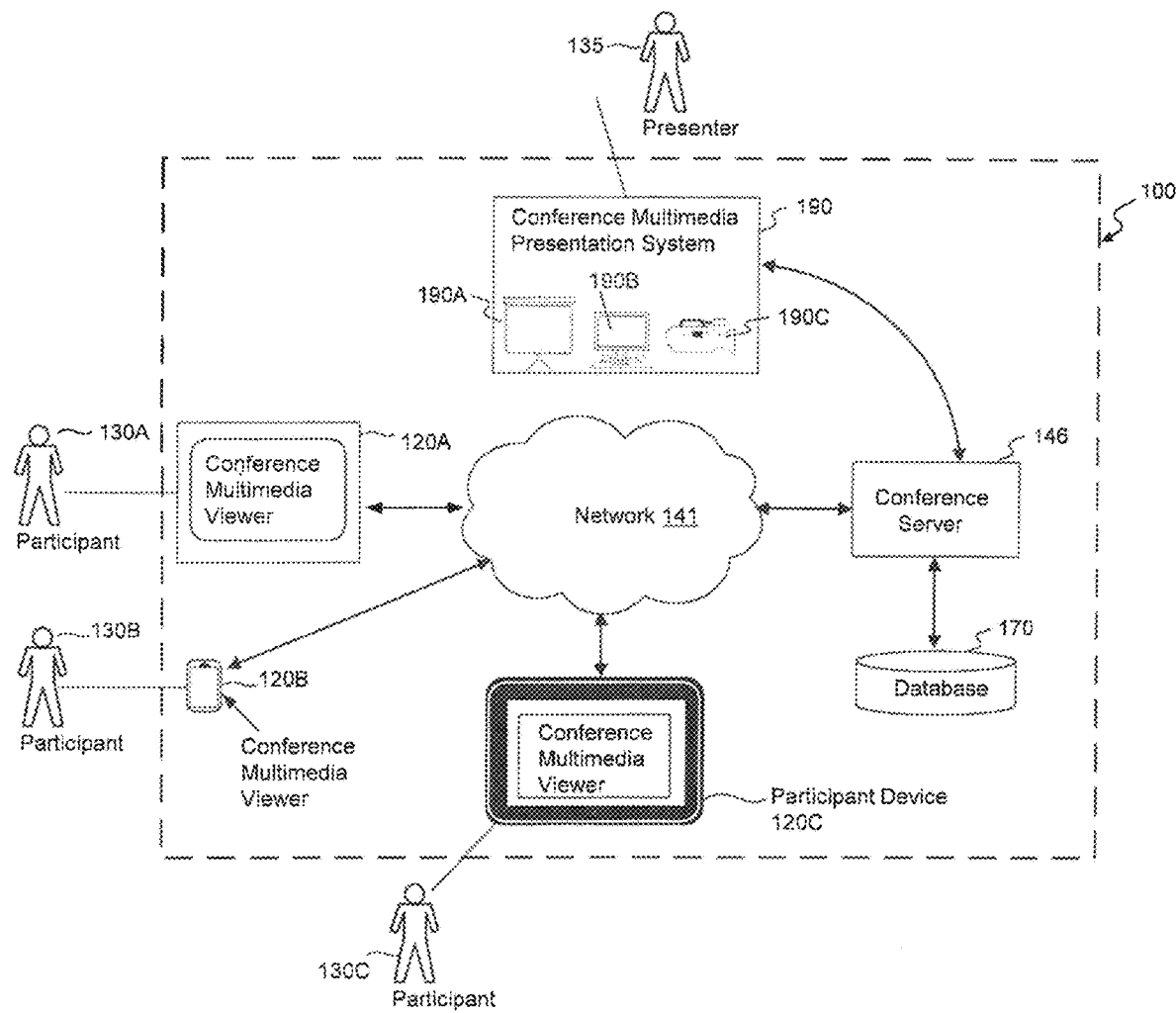
FIG. 1 shows an example system environment of a multimedia conferencing system in which various implementations described herein may be practiced.

The present disclosure generally relates to annotations for shared conferencing content. The conferencing content may include any type of multimedia content, such as video, audio, slides, images and text. The multimedia content may be shared during a conference. The terms "conference" or "conferencing" refer to a meeting in for example audio and/or video formats between users, herein referred to as participants or attendees. The term "attendee" refers to a participant who is not presenting at a conference. The term "presenter" refers to a participant who is presenting at a conference. The term "multimedia content" refers to content shared between participants in a form of presentation material such as presentation slides. In general, a multimedia conferencing system may be provided that allows participants to communicate with one another using a variety of different media types, and using various devices, such as mobile computing devices (e.g., smartphone, tablet computing devices, netbooks, etc.), personal computers (e.g., notebook computers, desktop computers, etc.), gaming consoles, conferencing consoles (e.g., Dolby Conferencing Console), conference phones, projectors, conference cameras, or other suitable devices. In various embodiments, the conferencing system may allow participants to communicate with one another using multimedia content, such as text, slides, audio and video data. The audio data may include synchronous and/or asynchronous voice data. For example, synchronous voice data may include multi-directional live audio exchanges, such as voice-over-IP exchanges, or exchanges using other varieties of telephony. In a similar manner, an example of a synchronous visual media type may include a multi-party video conference (e.g., which may be effectuated using video-over-IP or other suitable video conferencing technology), streaming video broadcast by one participant to another participant, etc.

During the course of a conference, participants may share multimedia content including documents, pictures, video clips, text messages, etc. through a network. For example, a multimedia conferencing system may include a web conferencing platform allowing participants real-time sharing of computer screens, individual computer applications or web-based content among computers and mobile devices of the participants. The web conferencing platform may be internet-based software as a service (SaaS) system. As another example, a multimedia conferencing system may include participants attending a lecture or a meeting at a location and interacting with each other in person and through mobile devices. For example, participants may attend a lecture and interact with each other through mobile devices while listening to a lecture.

In various embodiments, the multimedia conferencing system may allow a presenter to share multimedia content with participants. For example, a presenter may share slides with participants accompanied by real-time voice and/or video data associated with a presentation session. Control of the presentation session may be passed among participants to allow selected attendee to act as a presenter.

The presentation session may support annotations from participants. The term "annotation" refers to a visual or audible means of focusing participant's attention on a particular aspect or part of a presentation. In various example embodiments, the presentation may include slides, and the annotation may include highlighting parts of a presented slide. Additionally, or alternatively, the annotation may include selecting a part of multimedia content by drawing a boundary around the selected content. In some embodiments, the annotation of multimedia content may include changing a style of a part of the content during a presentation. Other annotations may include commenting portions of multimedia content, sketching over portions of multimedia content, or any other visual and audible means of focusing participant's attention on a particular portion of multimedia content.

In various example embodiments, the multimedia conferencing system may be configured to receive in real-time an annotation for a portion of multimedia content. The term "portion" may generally refer to a section of the multimedia content that is related to a singular topic. For example, an illustrative portion of multimedia content may include a paragraph of text, a set of figures, a formula, video data, audio data, a link, a picture, a slide, an interface to an application, a webpage, or a three-dimensional graphical object. In various embodiments, the multimedia conferencing system may further be configured to receive in real-time the annotation for more than one portion of multimedia content. For example, a single annotation can be used for several portions of a presentation, such as, for example, several disjoint paragraphs within a presentation, or a paragraph and a figure located on the same slide.

Alternatively, or additionally, the multimedia conferencing system may be configured to receive multiple annotations for one or more portions of the multimedia content. For example, a single portion may include a first annotation and a second annotation. The first annotation may, for example, include a specific set of markings related to the portion. In various embodiments, the specific set of markings may include drawing a boundary around a portion requiring annotation, highlighting the portion, or changing a font color within the portion, for an illustrative portion containing text. The second annotation may, for example, include an audio file associated with the portion. Additionally, or alternatively, the second annotation may include dynamic effects associated with the portion. For example, a dynamic effect may include highlighting of text within the portion when selected by a participant by positioning a mouse cursor over the portion. In general, the term "dynamic effect" refers to changes in multimedia content caused by presenter interacting with a presentation. An illustrative dynamic effect may include zooming to a portion of a slide, drawing a border around a portion of multimedia content, moving images or text within a portion of multimedia content, fading, focusing or brightening images or text within a portion of multimedia content, changing the rate of streaming data (such as slowing video data), or changing parameters of audio data (such as changing volume of audio data).

In various embodiments both presenter and a participant may be allowed to annotate portions of multimedia content and select different portions of multimedia content for annotation. Various selection methods may be used. For example, portions of multimedia content may be selected by a mouse pointer. In an illustrative embodiment, portions of multimedia content may be selected using an extendable pointer or a laser pointer. In some embodiments, a portion may be selected and annotated using a laser pointer. For example, a presenter may draw a boundary around a portion of multimedia content requiring annotation by waving a laser pointer and circling around the portion of the multimedia content.

In various embodiments, a presenter may tag portions of multimedia content with tags that are not visible to participants of a conference. The tags may allow presenter to select portions of multimedia content using a voice command. In an illustrative embodiment, the multimedia conferencing system may be configured to use an artificial intelligence functionality to detect information in a presenter's speech related to the tags associated with portions of the multimedia content. In an illustrative embodiment, the artificial intelligence system may annotate the portions of the multimedia content having tags corresponding to the detected information. Additionally, or alternatively, the artificial intelligence system may be configured to parse the multimedia content and identify text within the multimedia content. The artificial intelligence system may also be configured to transcribe the voice data associated with the presenter's speech, compare transcribed words of the presenter's speech with the text identified within the multimedia content, and annotate portions of the multimedia content that contain words or text patterns that match words or text patterns found in the presenter's speech. The term "text pattern" may include a set of words containing regular expressions, where the term "regular expressions" is a text string that may include wildcard characters.

In various embodiments a presenter may tag portions of multimedia content with tags that are audio data. For example, a presenter may tag portions of multimedia content with word identifiers. In an illustrative embodiment, a presenter may tag a portion of multimedia content using an audio signal corresponding to a specific word or phrase pronounced by a presenter, such as, for example, a word "introduction". In an alternative embodiment, a presenter may use several phrases to define an audio tag for a portion of multimedia content. In an illustrative embodiment, the multimedia conferencing system may be configured to use an artificial intelligence functionality to detect information in a presenter's speech related to the audio signal used to tag a portion of multimedia content. In an illustrative embodiment, the artificial intelligence system may annotate the portions of the multimedia content having audio tags corresponding to the detected information.

In various embodiments, a presenter may annotate portions of multimedia content using combination of several different methods. For example, a presenter may first select the portions using a laser pointer and then annotate the selected portions using voice commands. The multimedia conferencing system may be configured to recognize a preset number of voice commands that may correspond to standard annotations. For example, a voice command may include command for drawing a boundary around the selected portions, or for focusing the selected portion.

In various embodiments, the annotations may be added by body gestures. For example, a presenter may use a hand motion for moving an annotated portion of multimedia content to a different region within a presentation slide. In an illustrative embodiment, a presenter may use hand motion to zoom to an annotated portion of multimedia content. The body gestures may be detected by a camera. In an illustrative embodiment, several cameras may be used to detect complex body gestures that may require recording body movement of a presenter from several different directions. The body gestures may include hand motions, head motions, arm motions or combination of several motions.

In some embodiments, the multimedia conferencing system may include a system for tracking eye motion and direction of a presenter's gaze. The direction of presenter's gaze may be used as a pointer for presentation slides, and such pointer may be used to select a portion of multimedia content for annotation. Other means for selecting and annotating the content within the presentation may include detecting direction of presenter arms, hands and fingers or detecting changes in the presenter's voice.

In various embodiments, a portion may be annotated by more than one annotation. For example, a portion may be annotated using a first annotation that may include drawing a boundary around the portion. The second annotation for the portion may include dynamic effects, such as requiring the portion to increase in size when selected by a presenter. In some embodiments, the first annotation may be done by a presenter and a second annotation may be done by a participant. In some embodiments, the first annotation may be done by a presenter before a presentation, and a second annotation may be done during the presentation. In some embodiments, the second annotation may be done in response to participant's feedback. In some embodiments, the second annotation may be done as a comment for the first annotation.

In various embodiments, annotated portions of multimedia content may have a set of associated characteristics for manipulating the annotated portions of the multimedia content. The term "associated characteristics" may generally refer to permissions for manipulating a portion of multimedia content. For example, the associated characteristics may include allowing a participant to copy a portion of multimedia content, thus resulting in associated characteristics being "copiable by attendee." Various other characteristics may be associated with a portion of multimedia content which may include: allowing distributing the portion, allowing viewing the portion at a high resolution, allowing copying the portion at a low resolution, allowing other participants to view the portion, allowing obtaining a link to a stored version of the portion, allowing obtaining access to an application for viewing the portion, allowing obtaining access to an application for manipulating the portion, allowing sharing with others a link to a stored version of the portion, allowing manipulating the portion through a user interface that may be provided with the multimedia conferencing system, allowing modifying the portion, allowing annotating the portion, allowing communicating information about the portion to other participants, allowing viewing parts of the portion.

Other illustrative associated characteristics may allow a participant to manipulate a portion of multimedia content, where manipulations may include, highlighting the portion, liking the portion, agreeing with the portion, questioning the portion, commenting on the portion, annotating the portion, annotating the annotations of the portion, exporting the portion to a document, and sharing the portion.

In various embodiments, the multimedia conferencing system may be configured to receive a request from a participant to manipulate an annotated portion of multimedia content. In some embodiments, the annotated portion of the multimedia content may be available to a participant through a user interface accessed from the participant's device. The user interface may include, for example, an application for displaying and manipulating the annotated portion. In various embodiments, a request for manipulating an annotated portion of multimedia content may include an action allowed by the user interface commands. For example, if the user interface includes the copy command, such as, for example, a copy button, the request for copying the annotated portion may include pressing the copy button. The user interface commands may be selected in accordance with a set of characteristics associated with the annotated portion of the multimedia content. For example, if the associated characteristics allow copying and viewing the annotated portion, the user interface may only have these commands available to a participant. In general, various commands may be available to a participant related to various possible characteristics associated with the annotated portions. For example, a participant may be allowed to copy, download, view, share, comment, annotate and modify the annotated portion of the multimedia content.

Various example embodiments of the multimedia conferencing system include computer-implemented methods, tangible non-transitory computer-readable mediums, and systems. The computer-implemented methods may be executed, for example, by at least one processor that receives instructions from a non-transitory computer-readable storage medium. Similarly, systems and devices consistent with the present disclosure may include at least one processor and memory, and the memory may be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories or computer-readable storage mediums. As referred to herein, a "memory" may include any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Turning to the drawings, FIG. 1. shows an illustrative multimedia conferencing system 100 enabling a plurality of participants to interact with one another via the associated participant devices. In some examples, one or more components of conferencing system 100, such as conferencing server 146, may be used to implement computer programs, applications, methods, processes, or other software to perform the described techniques and to realize the structures described herein.

As shown in FIG. 1, the multimedia conferencing system 100 includes one or more user devices 120A-120C (collectively as participant devices 120), a network 141, a conferencing server 146, and a database 170. The components and arrangements shown in FIG. 1 are not intended to limit the disclosed embodiments, as the system components used to implement the disclosed processes and features may vary.

The network 141 facilitates communications and sharing of conferencing content between the participant devices 120 and the conferencing server 146. The network 141 may be any type of networks that provides communications, exchanges information, and/or facilitates the exchange of information between the conferencing server 146 and participant devices 120. For example, the network 141 may be the Internet, a Local Area Network, a cellular network, a public switched telephone network ("PSTN"), or other suitable connection(s) that enables conferencing system 100 to send and receive information between the components of conferencing system 100. A network may support a variety of electronic messaging formats and may further support a variety of services and applications for participant devices 120.

The conferencing server 146 may be a computer-based system including computer system components, desktop computers, workstations, tablets, handheld computing devices, memory devices, and/or internal network(s) connecting the components. The conferencing server 146 may be configured to provide conferencing services, such as setting up conferencing sessions for attendees 130A-130C and presenter 135. The conferencing server 146 may be configured to receive information from participant devices 120 over the network 141, process the information, store the information, and/or transmit conferencing information to the participant devices 120 over the network 141. For example, the conferencing server 146 may be configured to present multimedia content to attendees 130A-130C. In some implementations, the functionality of the conferencing server 146 described in the present disclosure is distributed among one or more of the participant devices 120A-120C. For example, one or more of the participant devices 120A-120C may perform function such as annotating a portion of the presented multimedia content and sending the annotated portion to a different participant.

The database 170 includes one or more physical or virtual storages coupled with the conferencing server 146. The database 170 is configured to store multimedia content as well as run-time data associated with participants during the conferencing session. The run-time data may include annotations from the participants, as well as audio, video and chat communications between the participants. The data stored in the database 170 may be transmitted to and from the conferencing server 146 before a conferencing session or during an ongoing conferencing session. In some embodiments, the database 170 is stored in a cloud-based server (not shown) that is accessible by the conferencing server 146 and/or the participant devices 120 through the network 141. While the database 170 is illustrated as an external device connected to the conferencing server 146, the database 170 may also reside within the conferencing server 146 as an internal component of the conferencing server 146.

As shown in FIG. 1, participants 130A-130C may communicate with the conferencing server 146 using various types of participant devices 120A-120C via network 141. As an example, participant devices 120A, 120C, include a display such as a television, tablet, computer monitor, audio conferencing console, video conferencing console, or laptop computer screen. The displays of participant devices may be configured to display a multimedia data communicated during a conference including displaying the annotations to portions of multimedia content. In various embodiments, the displays of participant devices may be configured to display audio data, video data, and text data associated with the conference, including the data related to interactions between participants and a presenter, such as feedback from participants. Participant devices 120A, 120B, and 120C may also include video/audio Input devices such as a video camera, web camera, or the like. As another example, participant device 120C includes mobile devices such as a tablet or a smartphone having display and video/audio capture capabilities. Participant devices 120A-120C may also include one or more software applications that facilitate the participant devices to engage in communications, such as IM, text messages, EMAIL, VoIP, video conferences, with one another.

The multimedia conferencing system may include a software application that allows control of a presentation session among participants. For example, in an illustrative embodiment, one participant may be selected to be a presenter at a conference. In general, the control of the presentation may be passed from the presenter selecting another participant to be the presenter. The multimedia conferencing system may include a software application that includes a Conference Multimedia Presentation System associated with the software application interface for a presenter, and a Conference Multimedia Viewer associated with the software application interface for an attendee. The interface for the Conference Multimedia Presentation System may be different than the interface for the Conference Multimedia Viewer. In various embodiments, the software application of the multimedia conferencing system may be configured to change user interface from the interface for the Conference Multimedia Presentation System to the interface for the Conference Multimedia Viewer depending on whether a participant is a presenter. In various embodiments, the Conference Multimedia Presentation System may be configured to allow a presenter to annotate a portion of multimedia content. Similarly, the Conference Multimedia Viewer may be configured to allow an attendee to annotate a portion of multimedia content. The annotated portion may have a different set of associated characteristics for a presenter than for an attendee. For example, the presenter may be allowed to modify the annotated portion of the multimedia content, while attendee may only be allowed to view the annotated portion.

As shown in FIG. 1, the Conference Multimedia Presentation System 190 has several components: a presentation module 190A for delivering a presentation to participants, a terminal module 190B for allowing presenter to interact with the presentation and acquire feedback from the participants, and a video module 190C, for recording and/or transmitting the presentation. The presentation module is configured to deliver multimedia content associated with a presentation. In various embodiments, the presentation module may display slides, pictures, video, play audio data, and display dynamic effects within slides. An illustrative presentation module depends on a configuration of the multimedia conferencing system. For example, when the multimedia conferencing system is configured to present multimedia content to participants located in a common room, such as a conference hall, an illustrative presentation module may include an overhead projector, a memory unit for storing the multimedia content of the presentation, a computer with a processor for delivering the presentation to the overhead projector, and a screen for displaying the presentation. Another illustrative presentation module may include a monitor for displaying the presentation, a memory unit for storing the multimedia content of the presentation, and a computer with a processor for delivering the presentation to the monitor. When the multimedia conferencing system is configured to present multimedia content over devices connected to a network, the presentation module may include an interface for a presenter to communicate the presentation to the conferencing server, and a client application for receiving the presentation from the server to a participant's device. In addition, the illustrative presentation module may include a user interface for a participant for displaying, annotating and manipulation multimedia content on a participant's device. For example, a user interface for a participant may include a web browser or web-based application.

In various embodiments, the multimedia conferencing system may be configured to allow a presenter to interact with the presentation module by annotating portions of multimedia content presented by the presentation module, A presenter may interact with the presentation module through auxiliary means. Examples of auxiliary means may include a mouse pointer, an extendable pointer, a laser pointer, presenters voice, or a presenter's body gesture. For example, a presenter may use a laser pointer to point to a portion of multimedia content displayed on a screen of the presentation module resulting in that portion being selected for an annotation. The presenter then may annotate the selected portion of the presentation using a voice command. In an illustrative embodiment, the annotation may include drawing a border around the portion of the multimedia content.

In the example embodiment of FIG. 1, the Conference Multimedia Presentation System 190 includes a terminal module 190B to facilitate presenter to interact with the presentation module. For example, the terminal module may mirror multimedia content presented by the presentation module. In some embodiments, the terminal module may include a computer memory medium for storing data associated with a conferencing presentation, a display device for displaying the data associated with the conferencing presentation, and a computer with a processor and peripheral input devices for interfacing with the memory and the display device.

In various embodiments, the computer memory medium in the terminal module 190B may include a software application having a user interface for allowing a presenter to interact with the data associated with the conference. In various embodiments, a presenter may interact with the user interface of the software application through peripheral devices which may include keyboard, mouse or other computer related input devices.

The terminal module 190B allows a presenter to annotate multimedia content of a presentation by interacting with the presentation module using peripheral devices. In addition, the terminal module may allow a presenter to interact with participants of the conference through the user interface of the terminal module. For example, the user interface of the terminal module may be configured to allow a presenter to send notifications to participants, exchange comments, and engage in discussions about portions of multimedia content.

The Conference Multimedia Presentation System 190 of FIG. 1 also includes a recording module 190C. In an illustrative embodiment, the recording module may include a camera capturing presenter's voice and video data during the presentation session. In an alternative embodiment, the recording module may include a microphone for capturing presenter's voice. The recording module may include a memory unit for storing data associated with a recorded presentation. In some illustrative embodiments, the recording module may be connected to the terminal module in order to exchange multimedia content and commands with the terminal module.

The recording module may capture and record video stream, transmit the recorded presentation data to a terminal module for processing and analysis of the data and transmit video to participants through a network in real time. For example, the processor of the terminal module may be configured to transcribe a recorded voice data and/or remove the noise from the recorded voice data. In some embodiments, the processor may be configured to parse words of the transcribed data, highlight keywords within the transcribed text and define properties and aspects of objects used during the presentation. In an illustrative embodiment, the processor may also be configured to process and modify recorded video data. For example, the processor may be configured to brighten the video data, to insert a background into the video data, to insert additional video or image data within the video data, to zoom to a portion of the video data or to insert annotations or comments in the video data. In some embodiments the annotations and comments may include links to other informational resources that can be accessed by a participant. In an illustrative embodiment, the recording module may contain several cameras. Different cameras of the recording module may record video at different zoom settings and from different directions allowing recording an immersive video. The term "immersive video" also known as 360-degree video may refer to video recordings where views in multiple directions are recorded at the same time. The video may be shot using an omnidirectional camera or a collection of cameras. During playback on normal flat display the viewer may have control of the viewing direction.

The recorded presentation data, such as voice and video data associated with a presentation, may be transmitted together with multimedia content of the presentation to the participants. During a presentation, a presenter may interact with objects related to the presentation. For example, the presenter may show an experiment to an audience, where the experiment may include various objects. In some embodiments, run-time audio data and annotated video data may be recorded by the recording module, processed by the terminal module, and transmitted to participants. In some embodiments, the annotations of the multimedia content of the presentation module is correlated with the objects interacted during the presentation. In various embodiments, the run-time audio data and the annotated video data may be processed and transmitted to participants without a noticeable delay.

Figure 2:
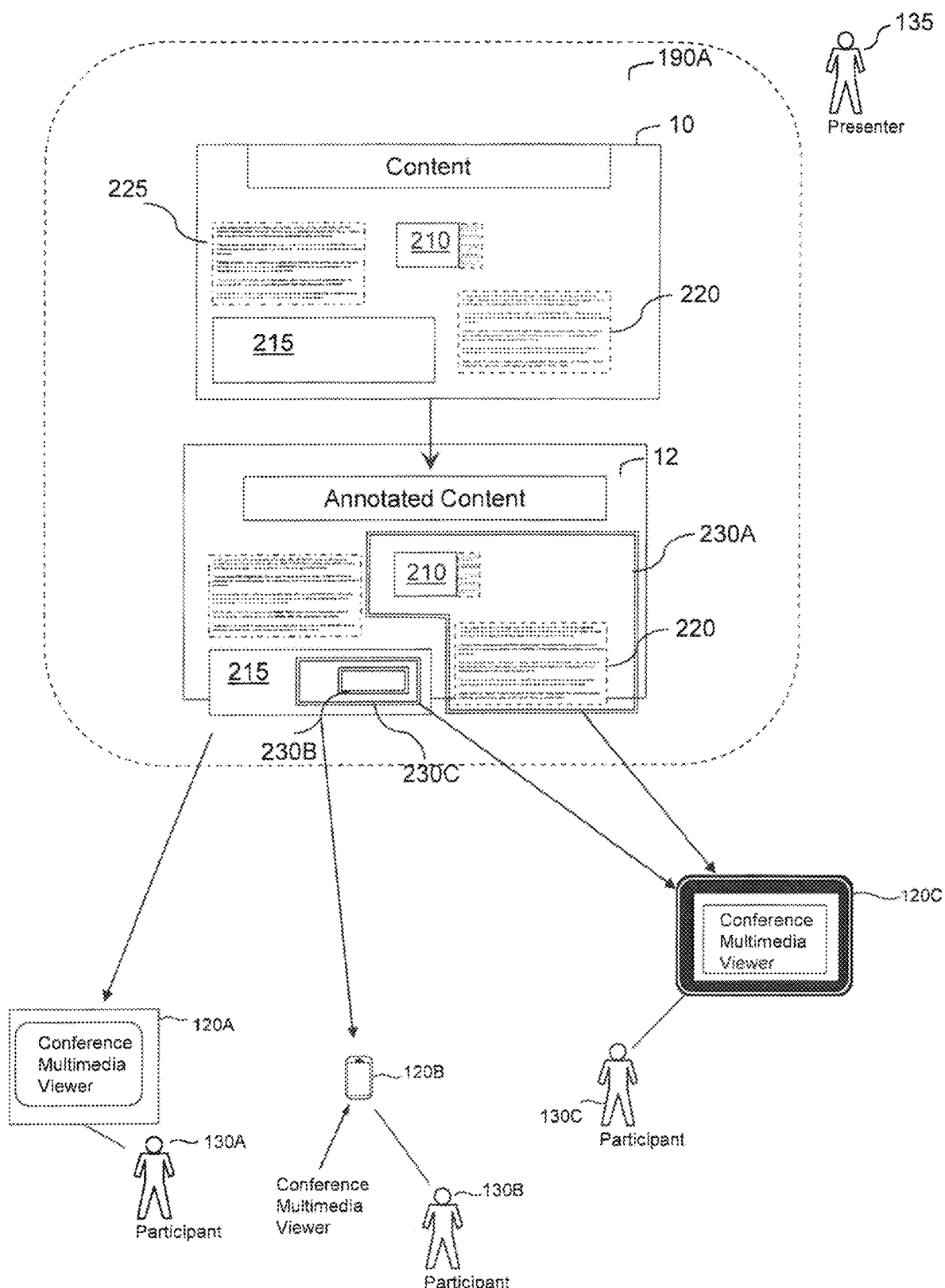
FIG. 2 shows an example process of annotating and distributing the multimedia content of the presentation by a presenter, in accordance with embodiments of the present disclosure.

FIG. 2 shows an example embodiment of the presentation module 190A which contains multimedia content 10 that may be annotated by a presenter to result in an annotated content 12. The annotated content 12 contains multiple portions indicated, for example, by regions 210, 215, 220 and 225. In the presently described example embodiment, regions 210, 220 and 225 include paragraphs, and region 215 is an image. In general, regions within a presentation may include paragraphs, figures, video or audio data. The content may be annotated using annotation 230A and annotation 230B. The annotation 230A may include drawing a boundary around several paragraphs 210 and 220, while annotation 230B may be used to select a portion of the image 215.

FIG. 2 shows different participants 130A-130C interacting with the multimedia conferencing system through the devices 120A-120C. FIG. 2 shows that different participants 130A-130C may receive different annotations. For example, the participant 130A may not receive any annotations, the participant 130B may receive only annotation 230B, and the participant 130C may receive both annotations 230A and 230B. The multimedia conferencing system may be configured to send one or more annotations to a participant based on multiple factors. One of the factors may be related to a participant's profile. For example, the participant's profile may reflect a familiarity of the participant with a subject of the presentation, and the annotations from a presenter may be chosen for the participant based on the participant's knowledge of the subject. In some embodiments, the presenter may prepare several annotations for the same portion of multimedia content, and the annotations that match a participant knowledge may be delivered to the participant. In some embodiments, different annotations for the same portion may be sent to two different participants. For example, where the portion 215 of the multimedia content is annotated with comments, the participant 130B may receive the annotation 230B including brief comments about the portion 215 of the multimedia content, while participant 130C may receive the extensive annotations 230C regarding the portion 215.

The multimedia conferencing system may be configured to send different annotations for different participants based on their interaction with the presentation. In some embodiments, a participant who is actively participating during the presentation may receive different annotations from a participant who is not actively participating during the presentation. In some embodiments, the measure of activity of the participant may be based on the frequency of questions to a presenter, the level of questions asked by the participant, the annotations received from the participant by the presenter, and/or a combination of all of the above.

FIG. 2 shows that different participants may interact with the multimedia conferencing system using different devices. For example, the devices may include a personal computer, and/or mobile computing devices (e.g., smartphone, tablet computing devices, netbooks, etc.). The multimedia conferencing system may be configured to select a format of the annotation based on the device used by a participant. In an example embodiment, the format of the annotation is selected to fit a display of a participant device without obscuring multimedia content of a presentation. In some embodiments, the annotations may be collapsed or expanded when a participant interacts with the annotations. In an illustrative embodiment, the participant may click on the collapsed annotations allowing them to expand. Additionally, or alternatively, the participant may interact with annotations using hand gestures to manipulate annotations on the display of the participant's device.

Figure 3A:
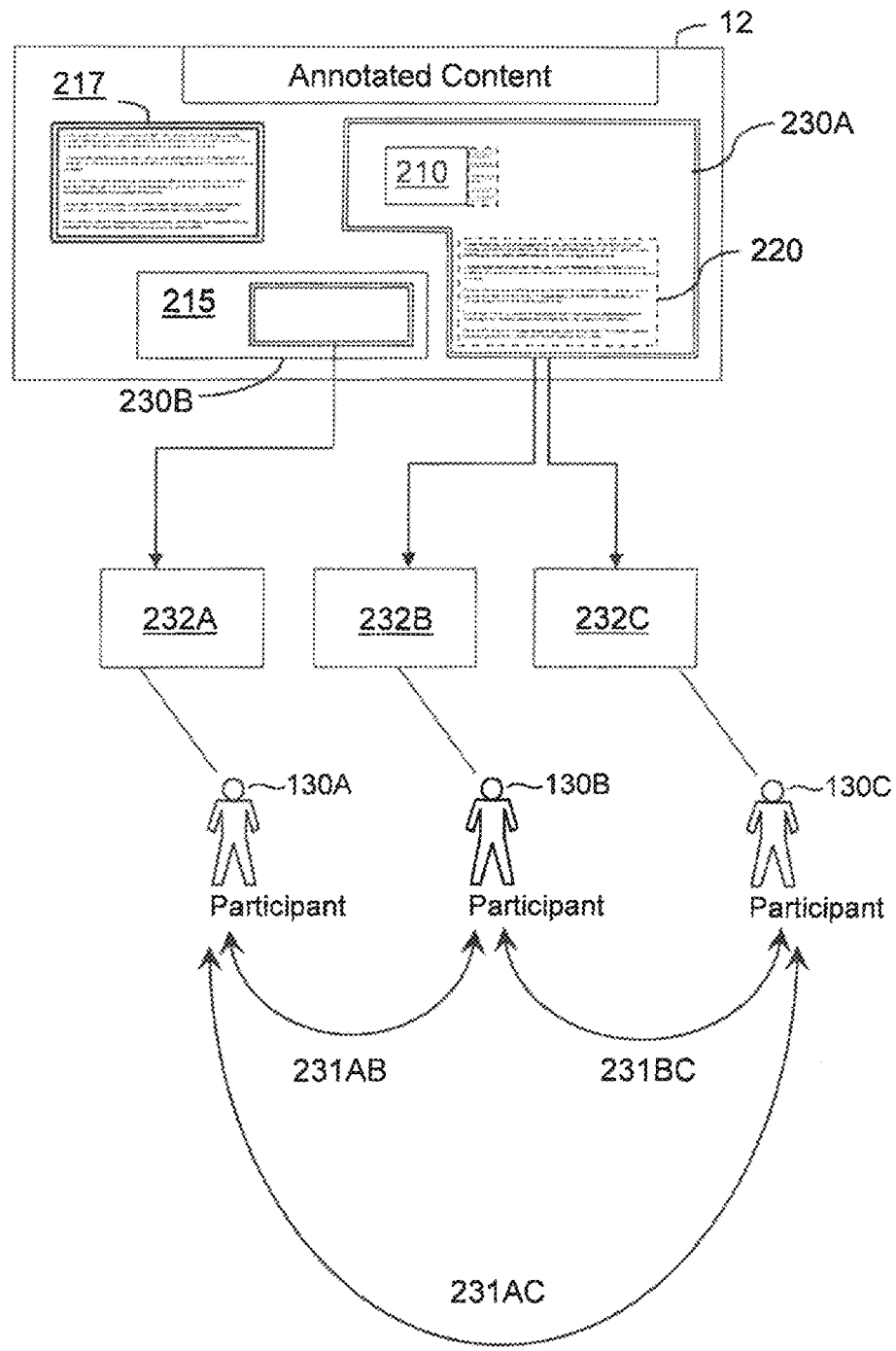
FIG. 3A shows an example of annotated content distributed to participants, in accordance with embodiments of the present disclosure.

In general, the multimedia conferencing system may be configured to receive multiple annotations for multiple portions of the multimedia content. For example, the multimedia conferencing system may be configured to receive an annotation for a portion of multimedia content having a first set of associated characteristics, and another annotation for another portion of multimedia content having a second set of associated characteristics. For example, FIG. 3A shows that the annotation 230B with the associated characteristics 232A is shared with the participant 130A, while the annotation 230A with the associated characteristics 232B is shared with the participant 130B. For instance, the associated characteristics 232A may allow the participant 130A to view the annotation 230B of the multimedia content at high resolution, while the associated characteristics 232B may allow the participant 130B to copy and edit the annotation 230A of the multimedia content. In some illustrative embodiments the annotation for the portion 230B may include text highlighting, while the annotation for the portion 230A may include detailed comments.

FIG. 3A shows that the annotation 230A may be shared with different participants and have different associated characteristics for each participant. For example, annotation 230B has associated characteristics 232B for participant 130B that are different from the associated characteristics 232C for the participant 130C. As shown in FIG. 3A, the participants may share the annotated portions of the multimedia content through the network connection 231AB, 231BC and 231AC. In various embodiments, the sharing of the annotated portion of the multimedia content may be allowed. In some illustrative embodiments, only annotations from attendees may be shared between the attendees. For example, if the participant 130C modifies the annotated portions 220 and 210 containing annotation 230A and shares the annotated portions 220 and 210 containing annotation 230A with the participant 130A, the participant 130A may not be able to see the annotations 230A as these annotations were not shared with the participant by a presenter. In some embodiments, the participant 130A may be able to see the changes to the portions 220 and 210 created by the participant 130C, as long as these changes are not related to the annotations 230A. In some example embodiments, the participants may share annotated portions of the multimedia content without sharing associated characteristics for the annotated portion of the multimedia content. For example, the participant 130C may share the annotated portions 220 and 210 with the participant 130B without sharing the associated characteristics. For example, if the participant 130C has associated characteristics that allow the participant to copy and modify the annotated portions 220 and 210, the participant 130C may not impart his/her associated characteristics to the participant 130B through sharing the annotated portions 220 and 210.

Figure 3B:
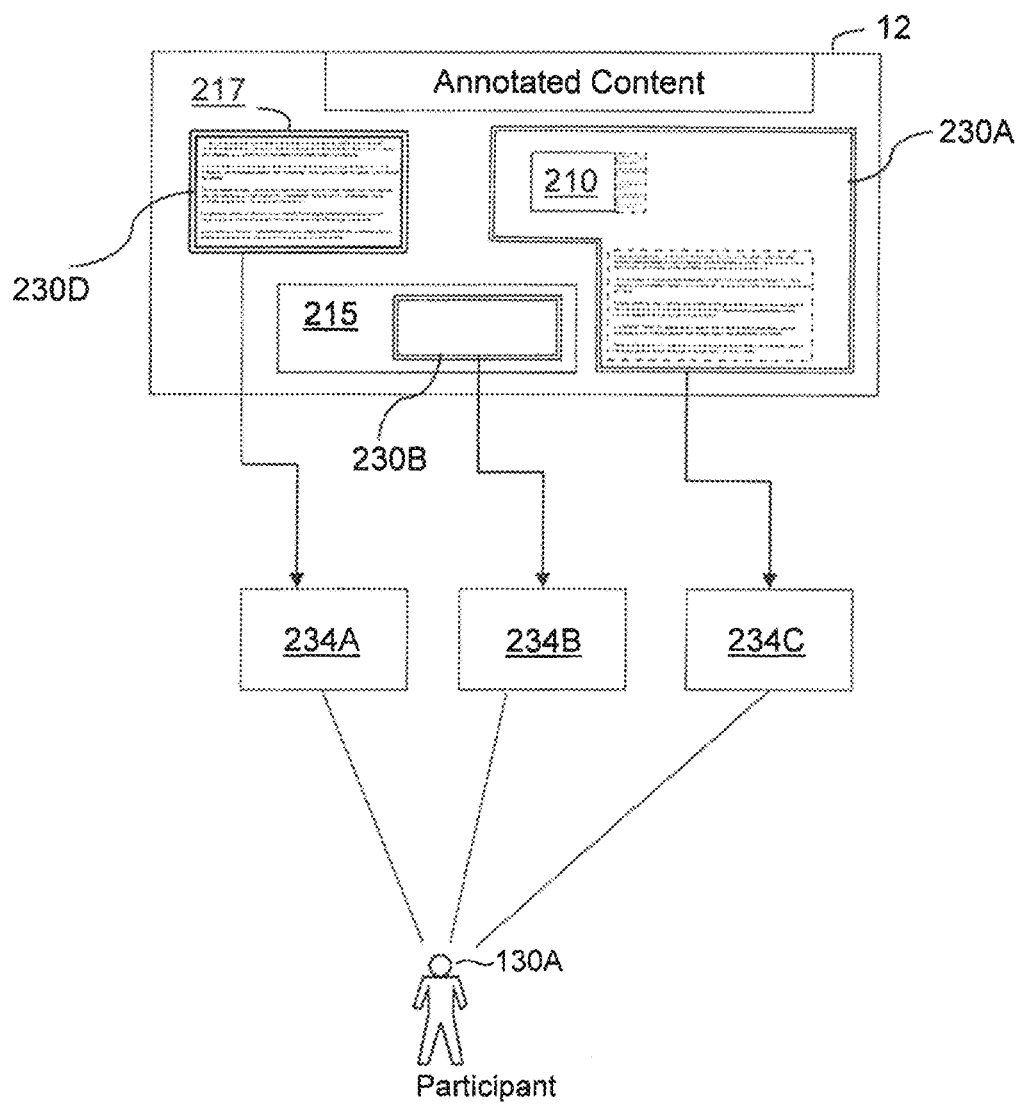
FIG. 3B shows another example of annotated content distributed to participants, in accordance with embodiments of the present disclosure.

FIG. 3B shows an illustrative example of the multimedia conferencing system sharing several annotated portions with annotations 230A, 230B, and 230D with a participant 130A. The different annotations 230A, 230B, and 230D may have different associated characteristics. For instance, the annotation 230A may have different associated characteristics 234C from the annotation 230B with the associated characteristics 234B. Similarly, characteristics 234A associated with annotation 230D may be different from characteristics 234B and/or 234C. For example, the annotation 230A may allow the participant to copy the annotated portion, while the annotation 230B may allow both copying and modifying the annotated portion.

Figure 4:
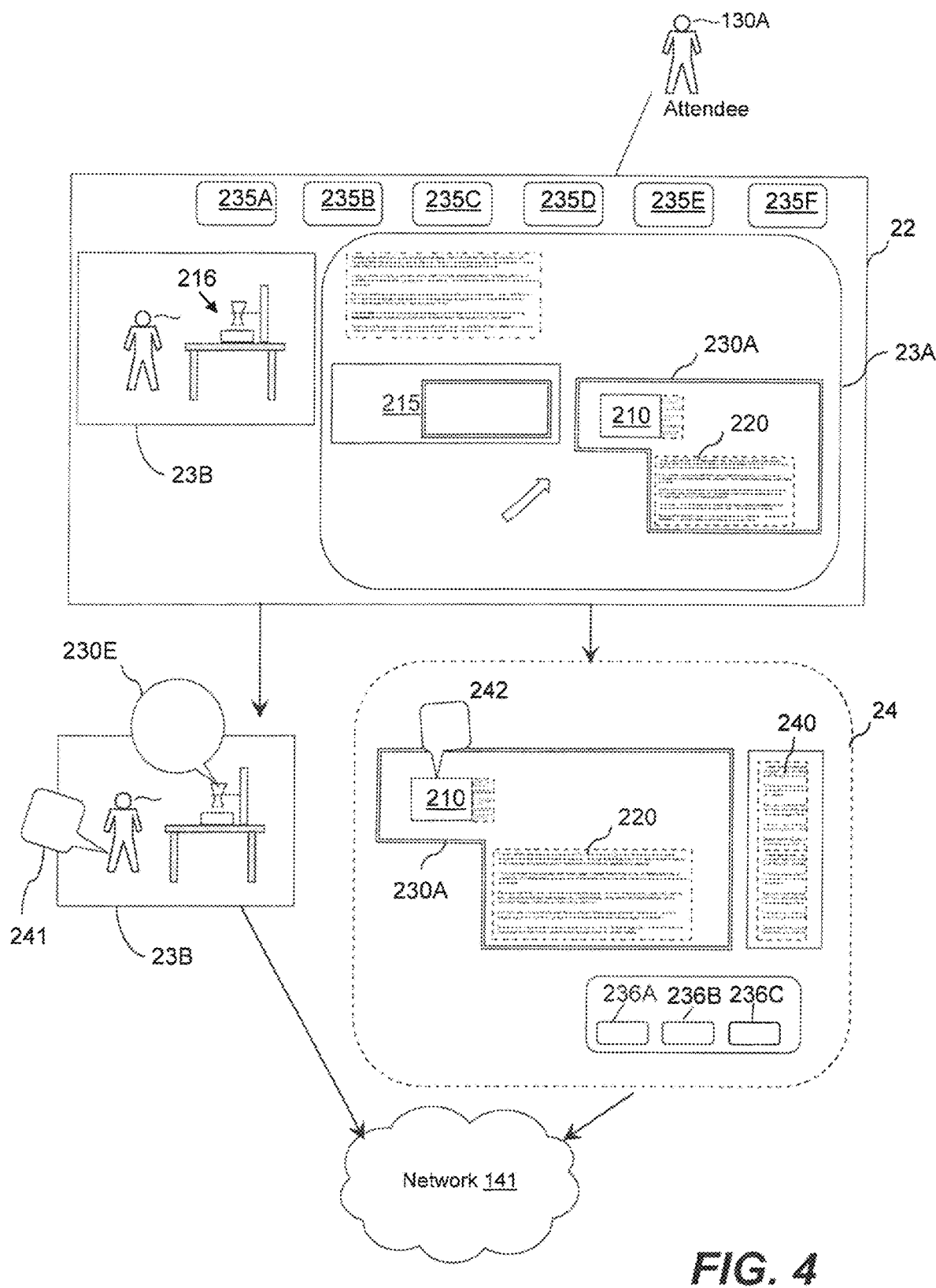
FIG. 4 shows an example user interface for a participant.

FIG. 4 shows a multimedia conferencing system with an Illustrative user interface 22 for a participant. The illustrative user interface 22 includes a graphical user interface (GUI) such as the window 23A for displaying multimedia content of a presentation. Additionally, the user interface 22 may include a window 23B for displaying a recorded presentation data such as audio and/or video data from a presenter. For example, the recorded presentation data may describe an experiment, and the presenter may manipulate objects 216 during the presentation. The user interface 22 may include elements 235A-235F designed to manipulate annotated portions of the presentation. In an embodiment, one of the illustrative elements 235A-235F may include a button, a dropdown list, a radio button, a search field, a command field, or any other graphical element that may represent a user-defined command. The participant can use user interface 22 to manipulate the annotated portions of the presentation and share the manipulated portions with other participants.

FIG. 4 shows that the multimedia conferencing system may be configured to allow a participant to annotate the annotated portions of the presentation. For example, the participant, may have an interface 24 that allows participant to annotate the annotation 230A, with participant annotations 240. The interface 24 may include the elements 236A-236C for annotating the annotated portions of the presentation. For example, FIG. 4 shows that the interface 24 may allow a participant to annotate portions 220 and 210 of the multimedia content. In various embodiments, a participant may annotate the multimedia content with additional comments. For example, FIG. 4 shows the comment 240 used to annotate the portions 220 and 210 by a participant. In various embodiments, a participant may not only annotate the portions of a multimedia presentation, but also annotate the annotations of a presenter related to these portions. For instance, FIG. 4 shows the annotation 230A that may be annotated by a participant using the interface 24.

In various embodiments, a participant may annotate a recorded presentation data, such as audio and video data schematically displayed in window 23B. In an illustrative embodiment, the video data may contain the presenter's annotation 230E and the participant may further annotate the video with participant annotations 241. In various embodiments, participant's annotations may include leaving a comment for a particular aspect of the audio or the video data, asking a question about concepts or objects within the audio or the video data, or annotating the transcribed speech of the audio data.

In an example embodiment, the video data (also referred to as video) may be annotated after it was recorded. For example, the presenter, may record part of the presentation, pause the recording and annotate parts of the video. The annotations for the video may only appear for a set of video frames that span an interval of video time. For example, the annotations may only appear for a minute during a specific event shown in the video. Additionally, or alternatively, the annotations for the video may be permanently presented in a participant's window that shows the video for the entire duration of the video. In general, the location of the annotations may be suggested by the multimedia conferencing system as not to obscure the video content. For example, the multimedia conferencing system may use an artificial intelligence functionality to detect changes in video frames and suggest annotating the part of the video that does not show a lot of change. For example, the multimedia conferencing system may suggest placing the annotations at regions that show flat unmovable surfaces within the video, such as walls.

In some embodiments, the video may be annotated during the recording by placing annotations in a selected area of the video at a first instance of time during the video recording and removing the annotations at a second instance of time during video recording. In an example embodiment, a presenter may interact with the multimedia conferencing system using audio signals to incorporate annotations into the video data. For example, following an audible command from the presenter, the annotations may appear in the video at a first instance of time during the video recording. Similarly, following an audible command from the presenter the annotations may disappear from the video at a second instance of time during the video recording. The annotations may appear at a fixed place, such as, for example, near a stationary object of the video, or follow the moving objects in the video. For example, the annotations may include, text or images appearing next to the presenter and moving with the presenter.

In some embodiments, the video may be annotated by participants. For example, the video may be annotated during the video broadcasting to participants through the graphical user interface of a participant. In an example embodiment, the video may have associated characteristics allowing the participant to manipulate the video. In an example embodiment, a participant may be allowed to record the video and annotate the recorded video using the graphical user interface.

In various embodiments, a participant may further comment on portions of a presentation that do not contain annotations. The comments may include complex annotation or may include preset comments. For example, a preset comment may include "liking" the portion of the presentation, "agreeing" with the portion of the presentation, "being confused" by the portion of the presentation and/or the like. FIG. 4, depicts, for example, a participant posting a comment 242 for a portion 210 of the multimedia content of the presentation. The multimedia conferencing system may be configured to share a comment posted by a participant with a presenter, and to provide feedback to a presenter. Additionally, or alternatively, the multimedia conferencing system may be configured to share the comment with other participants. Alternatively, the comment may be posted but not shared by a participant.

In various embodiments, a comment may be shared based on some events that may occur during a presentation. For example, in an illustrative embodiment, the comment may be automatically shared if more than a critical number of other participants have the same or similar comment or question. In some embodiments, the comment may be automatically shared if it constitutes an answer to a question of another participant or a presenter. The comment may be automatically shared, if it constitutes an answer to a question asked by a critical number of other participants. The comment may be first input by a participant and shared later depending on events during a presentation. Similarly, annotations by a presenter may be first recorded and shared later depending on events during a presentation. The user interface 22 may be configured to allow an attendee to select other participants to receive attendee's posted comment. The user interface 22 may be configured to share the attendee's comments between all the attendees that have the same annotated portion of a multimedia content. For example, some attendees may be selected by a participant to receive an annotated portion of a multimedia content. These attendees may be allowed to share the annotated portion as well as their comments about the annotated portion with each other. As illustrated in FIG. 4, attendees may be able to share their annotations for portions of multimedia content including annotations for recorded presentation data via network 141.

Figure 5:
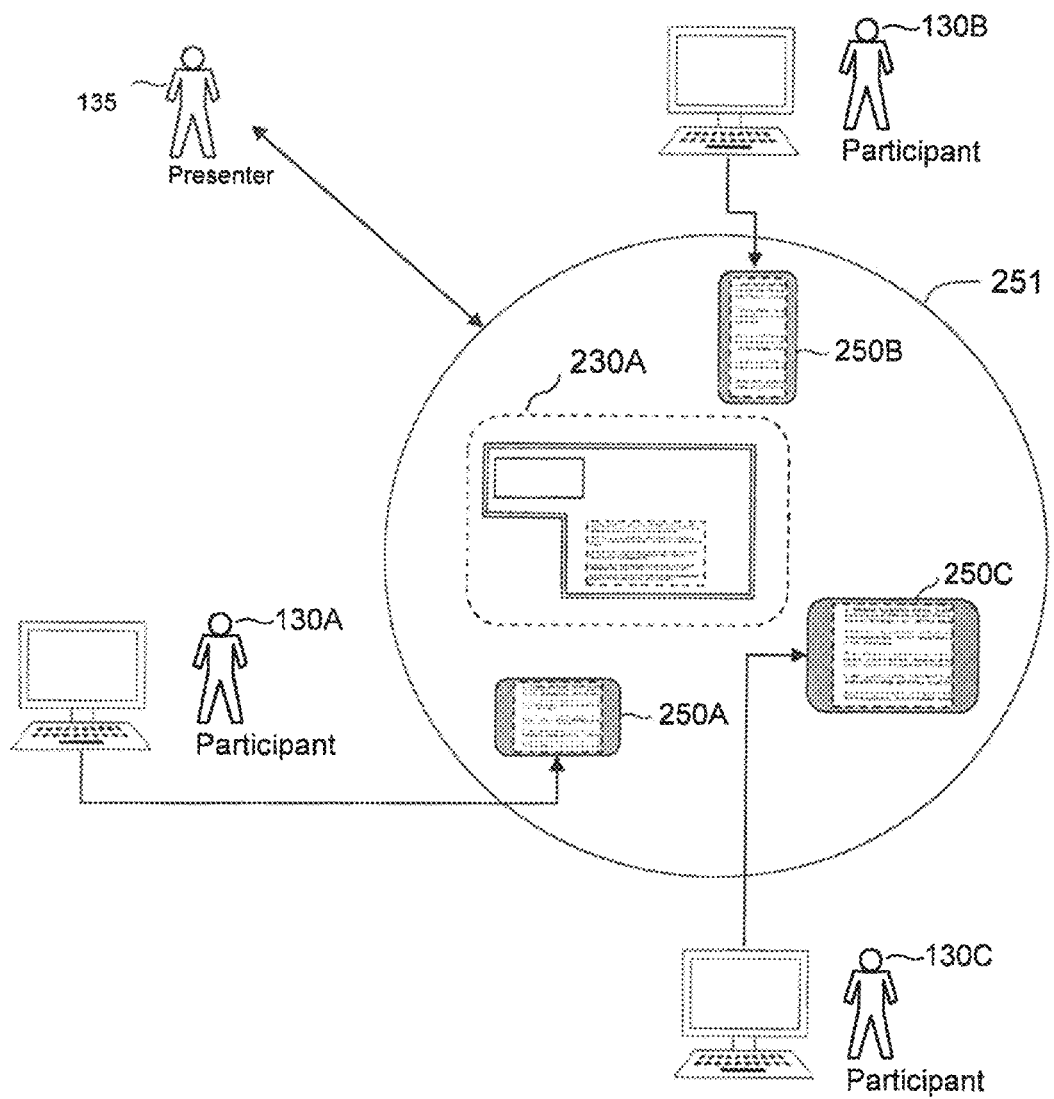
FIG. 5 shows an example process of participants forming a group and commenting on the annotated content, in accordance with embodiments of the present disclosure.

FIG. 5 shows an illustrative configuration of the multimedia conferencing system where multiple participants may be allowed to share annotated portions of the multimedia content. For instance, the annotated portions 220 and 210 of the multimedia content with the annotation 230A may be shared between a group of participants 130A-130C using a group discussion system 251. Accordingly, during the discussion, each participant 130A-A130C may be allowed to annotate the annotated portions 220 and 210 with respective annotations 250A-250C. The participants may have several rounds of discussion for the annotated portions 220 and 210. In one illustrative example, the group discussion system may support a group chat window allowing participants to interact with one another and discuss the annotated portions. Additionally, or alternatively, a presenter may also join the group discussion through the group discussion system. In some embodiments, a presenter may interact with participants through a group chat window. Additionally, or alternatively, a presenter may interact with each participant separately through a dedicated presenter-participant chat communication interface. In various embodiments, the group chat window and the presenter-participant chat communication interface may support exchange of multimedia content that may include, text, slides, images, numerical data as well as audio and video data.

In various embodiments, participants may form a private discussion group that is not explicitly connected to a presenter. For example, participants may want to discuss elements of a presentation including recorded presentation data without interacting with a presenter. In various embodiments, the members of a private discussion group may choose to interact with a presenter through messages approved by all the members of the private discussion group.

Figure 6A:
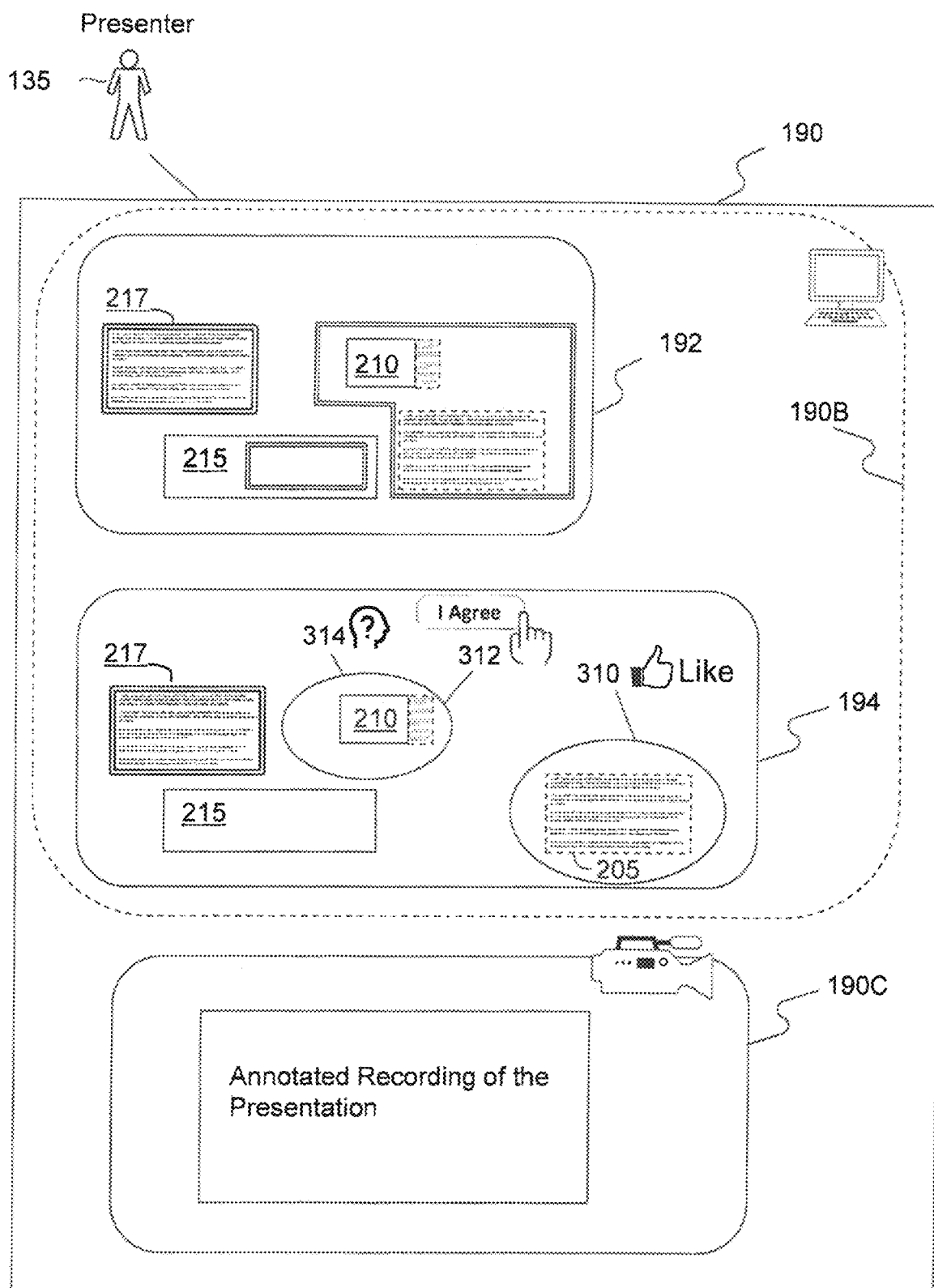
FIG. 6A shows an example user interface for a presenter, in accordance with embodiments of the present disclosure.

FIG. 6A shows a Conference Multimedia Presentation System 190 with additional details for a terminal module 190B and a recording module 190C. The illustrative terminal module 190B includes a window 194 that may mirror multimedia content of a presentation and allows a presenter to annotate portions of the multimedia content.

FIG. 6A shows that terminal module 190B includes a GUI such as window 194 with various portions 205, 210, 215 and 217 of the multimedia contents, in the presently described embodiment, the window 194 of the terminal module 190B is configured to receive a feedback from participants to a presenter regarding different portions of the presentation. Each portion may receive more than one type of a feedback response. For example, as shown in FIG. 6A, the portion 205 may receive "like" comments 310, the "question mark" comment 314 indicating that a participant may be confused about this portion, and "I agree" comment 312 indicating an agreement from a participant. The described comments may only be illustrative, and many other comments are possible. The terminal module may be configured to calculate statistics of the comments from participants and report to a presenter the most frequent comments, and the number of comments related to a particular topic. In various embodiments, the comments from participants may be selected from a preset set of comments. Additionally, or alternatively, freestyle comments may be allowable as well. In an illustrative embodiment, a processor of the terminal module may be configured to analyze comments and extract useful information for a presenter. For example, the useful information may indicate a portion of the presentation that needs to be explained in more detail or the useful information may correspond to a feedback from participants regarding portions of the presentation that are not very useful for participants. In some embodiments, the feedback from participants may be related to aspects of the recorded presentation data, such as clarity of presenter's speech, or organization of the presentation.

In some embodiments, participants may engage in manipulating annotated portions of multimedia content, and the multimedia conferencing system may be configured to report, record or analyze each act of manipulation by a participant. For such configuration of the multimedia conferencing system, the processor associated with a terminal module may be configured to analyze different manipulations performed by participants and provide a feedback to a presenter about portions that were manipulated. For example, the processor of the terminal module may be configured to transmit to a presenter feedback information related to which portions of the multimedia content were copied, and which portions of the multimedia content are currently discussed within various participant groups.

The terminal module may be configured to display statistical information related to the feedback information from participants using graphical means. For example, the various manipulations may be displayed as a set of bars on a bar graph. The size of the bar may indicate the number of manipulations, and each bar may correspond to a manipulation type. In various embodiments, other graphical means may be used. For example, statistical information may be displayed as a set of points in a Cartesian plane that may track the number of participants "liking" the presentation throughout the duration of the presentation. The described graphical means may only be illustrative, and many other graphical means are possible.

Based on the feedback from the participants, such as the feedback information obtained from the comments of participants, a presenter may either change the flow of a presentation or modify annotations for portions of multimedia content of the presentation. For example, in an illustrative embodiment, a presenter may return to a portion of the presentation that requires further explanation due to comments from participants.

FIG. 6A also shows the recording module 190C for recording, annotating and communicating voice and video data of a presentation to participants. The module 190C may include a camera for recording presenter's speech and movement. The module may include a system of cameras for recording a presenter from several different directions. In an illustrative embodiment, a set of cameras may construct a three-dimensional presentation video, allowing a participant to select the viewpoint for a video, and/or the viewpoints for the objects manipulated by a presenter. The recording module may be configured to transcribe a speech of a presenter and communicate the presenter's speech via text to participants. Additionally, or alternatively, the module may be configured to identify objects manipulated by a presenter during the presentation based on presenter's explanation and visual appearance of the objects. The module may be configured to annotate the objects by identifying presenter's suggestions for annotation during a speech by a presenter, or by transcribing the presenter's speech and matching keywords to the objects manipulated by a presenter. In addition, the module may further use transcribed speech to identify portions within the multimedia content that requires annotation.

Figure 6B:
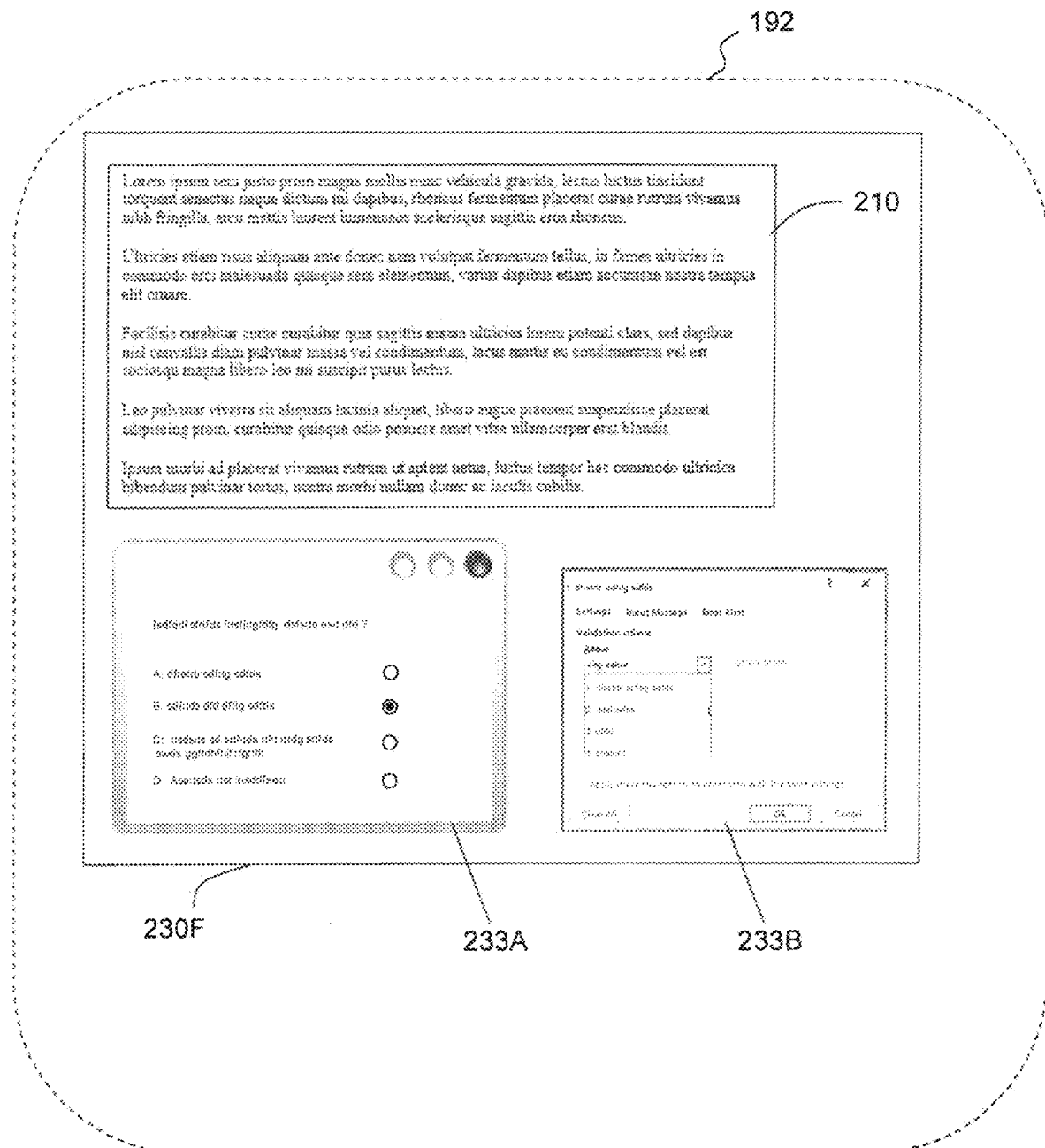
FIG. 6B shows an example of annotated content containing graphical user interface (GUI), in accordance with embodiments of the present disclosure.

In some embodiments, annotations to portions of multimedia content may include interactive objects. For example, the annotations may include widgets having GUI objects. FIG. 6B shows, for example, a paragraph 210 of the presentation that is annotated using a border 230F and two GUI objects 233A and 233B. Such objects may include buttons, dropdown lists, radio buttons, search fields, command fields, or any other graphical elements that may represent a user-defined command. In illustrative embodiments, the annotations may include multiple choice questions, or may be configured to elicit a response from participants. For example, FIG. 6B shows that 233A may be a multiple choice question, and 233B may be a dropdown list. In some embodiments, the response from participants may be timed, and the timing of the response as well as correctness of the response may be used as a feedback to a presenter.

Figure 6C:
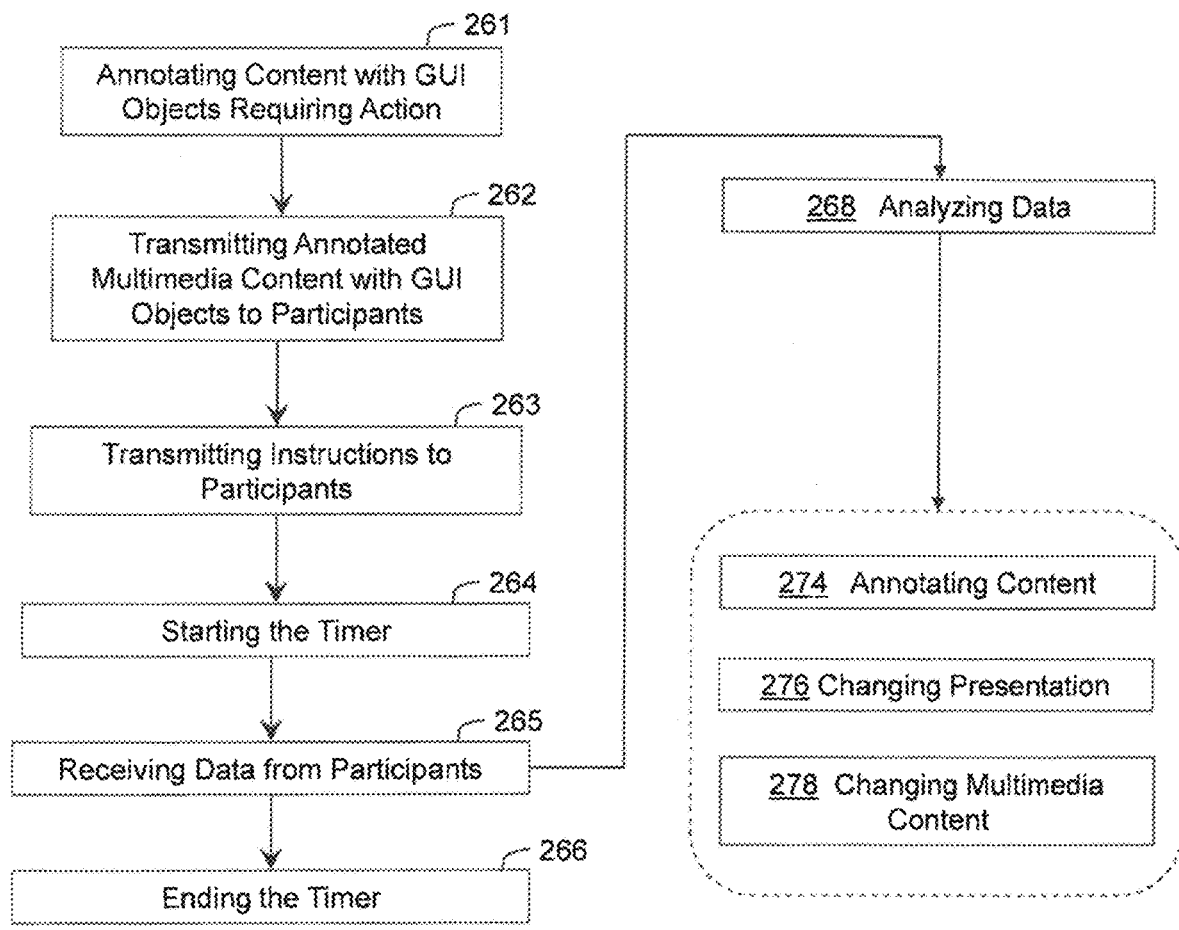
FIG. 6C is a flowchart of an example process for annotating a presentation and collecting feedback data, in accordance with embodiments of the present disclosure.

FIG. 6C depicts a flowchart representing a process of annotating content with GUI objects and receiving feedback from the participants. In step 261, the multimedia conferencing system may annotate multimedia contents with GUI objects that require one or more actions from participants. For example, such GUI object may constitute multiple choice questions, and the actions from the participants may include selecting answers to the multiple choice questions. In some embodiments, a presenter may select annotations with GUI objects. Additionally, or alternatively, the multimedia conferencing system may be configured to select annotations with GUI objects automatically.

In some embodiments, the multimedia conferencing system may be configured to present various annotations with GUI objects to a presenter and the presenter may choose one of the annotations with GUI objects presented by the multimedia conferencing system. In some embodiments, the annotations including widgets may be chosen from a pool of different widgets with preset functions. For example, the pool of different widgets may include a collection of multiple-choice questions related to a subject of the presentation. In some embodiments, the presenter may choose annotations based on the response from the participants during the course of the presentation.

In step 262, the multimedia conferencing system may transmit the annotated multimedia content containing GUI objects requiring actions to participants, and in step 263 the multimedia conferencing system may transmit instructions to participants related to the actions needed for GUI objects. For example, when GUI objects contain questions for participants, such instructions may be verbal or written instructions from a presenter describing how to answer the questions presented within GUI objects. The multimedia system may start the timer in step 264 and receive data from participants in step 265. The data from participants may include the answers to the questions presented within GUI objects, the time it took participants to answer the questions, the feedback from the participants about the questions, the steps that participants took to interact with the GUI objects, or/and the like. The data generally relates to a type of the GUI object and may be different for different objects. For example, for GUI objects containing questions the data may include answers to the questions, and for GUI objects containing graphics, the data may include steps for manipulating the graphics.

FIG. 6C shows that the multimedia system may stop the timer in step 266. The received data from participants may be analyzed in step 268. The analysis depends on the data from participants and may include verifying the correctness of answers from participants, determining statistics for the response time from participants or collecting the statistics related to feedback from participants. For example, GUI objects may contain a question whether the ongoing presentation is useful to participants, and participants response may include several choices ranging from "very useful" to a "waste of time." In step 268, for example, the data may be analyzed to determine how many participants are satisfied with the ongoing presentation. The multimedia conferencing system may perform various steps based on the data analysis in step 268. For example, in step 274 the multimedia conferencing system may annotate a portion of multimedia content, in step 276 the multimedia conferencing system may change how the material is presented, and in step 278 the multimedia conferencing system may change the multimedia content of the presentation. The steps 274, 276 and 278 may be unrelated and the multimedia conferencing system may execute either one of the steps 274, 276, or 278, or any combination of these steps in any order. The elements of the flowchart in FIG. 6C should be interpreted broadly and not limited to examples described. Further, the steps disclosed in the flowchart may be modified in any manner, including reordering steps and/or inserting or deleting steps.

In various embodiments, the user interface for participants may be configured to allow participants to annotate portions of multimedia content with widgets containing GUI objects. The multimedia conferencing system may include a widget building module allowing for both attendees and a presenter to build and deploy widgets as annotations to multimedia content of a presentation. The GUI objects may interface with a software application. The multimedia conferencing system may be configured to allow participants and a presenter to write a user script for the software application communicating with the widget, where user script may be executed by a processor of the presentation module.

Figure 7:
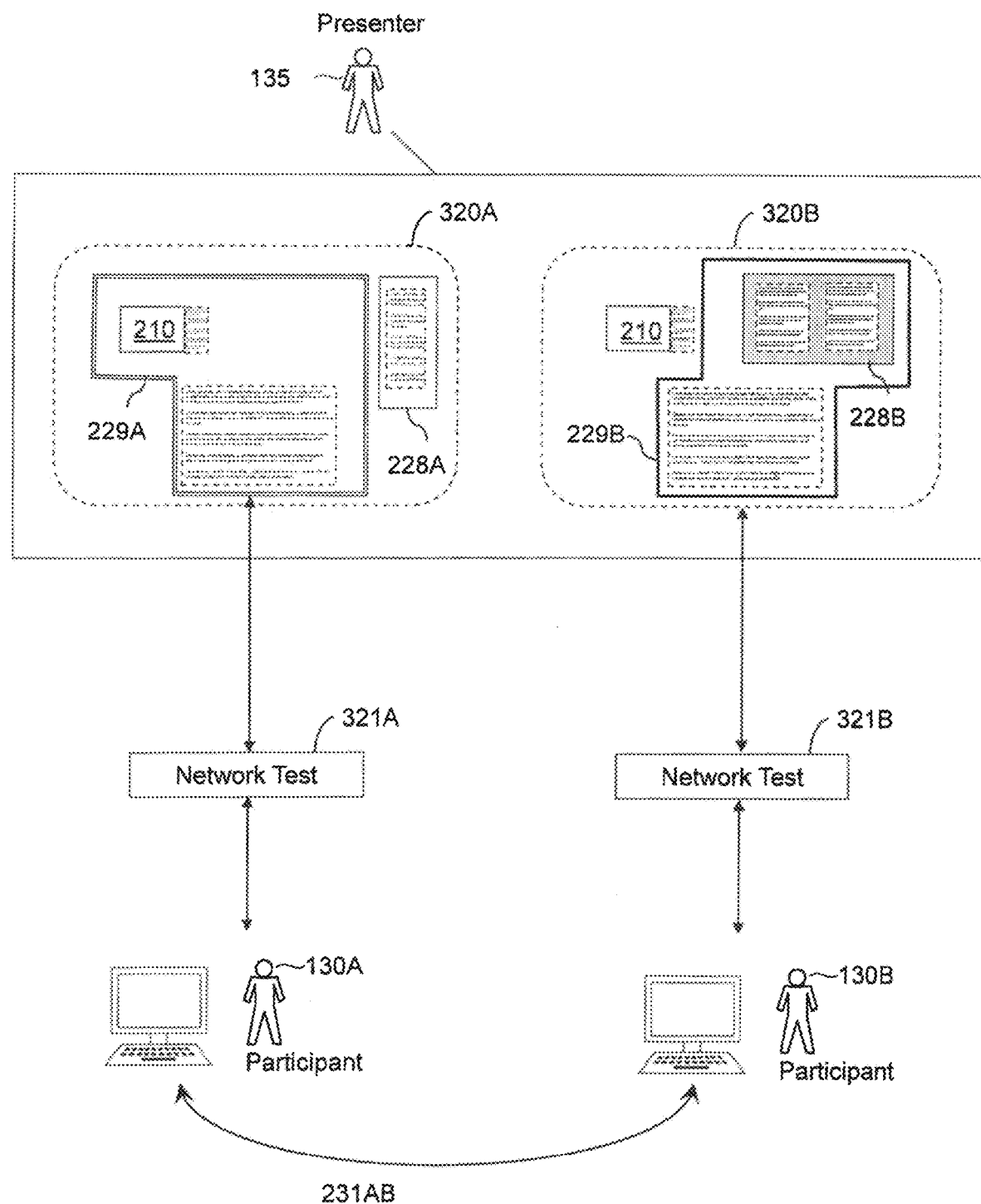
FIG. 7 shows an example multimedia conferencing system with multiple annotated portions corresponding to different participants, in accordance with embodiments of the present disclosure.

The multimedia conferencing system may be configured to transmit different annotations for different participant based on type of devices used by a participant, and/or based on security and/or speed of a network associated with each participant device. FIG. 7 shows an illustrative system that selects different annotations 320A and 320B, containing comments 228A and 2288, as well as annotation graphics (e.g., borders) 229A and 229B, for different participants based on network test results 321A and 321B. For example, the multimedia conferencing system may be configured not to share the annotations containing audio data with a participant that is unable to receive the audio data. Additionally, or alternatively, the multimedia conferencing system may be configured not to share the annotations with a participant connected to a conference through a network that is too slow, while requiring that the annotations are synchronized with the multimedia content of the presentation. Additionally, or alternatively, parts of the presentation that may require secure connection may not be delivered to a participant that is connected to a conference over unsecured network.

In various embodiments, the multimedia conferencing system may be configured such that parts or the presentation may not be transmitted to a participant depending on participant's network configuration. For example, a participant on a slow network may not receive video data associated with the recorded presentation and may only receive audio data. In some embodiments, for slow networks, a participant may only receive a transcribed text of presenter's speech. In various embodiments, as shown in FIG. 7, the multimedia conferencing system may be configured such that the participant 130A may only share the information through the connection 231AB with participant 130B that is allowed based on the security settings of the participant 130B. Similarly, the participant 130B may only share the information through the connection 231AB that is allowed based on the security settings of the participant 130A.

Figure 8:
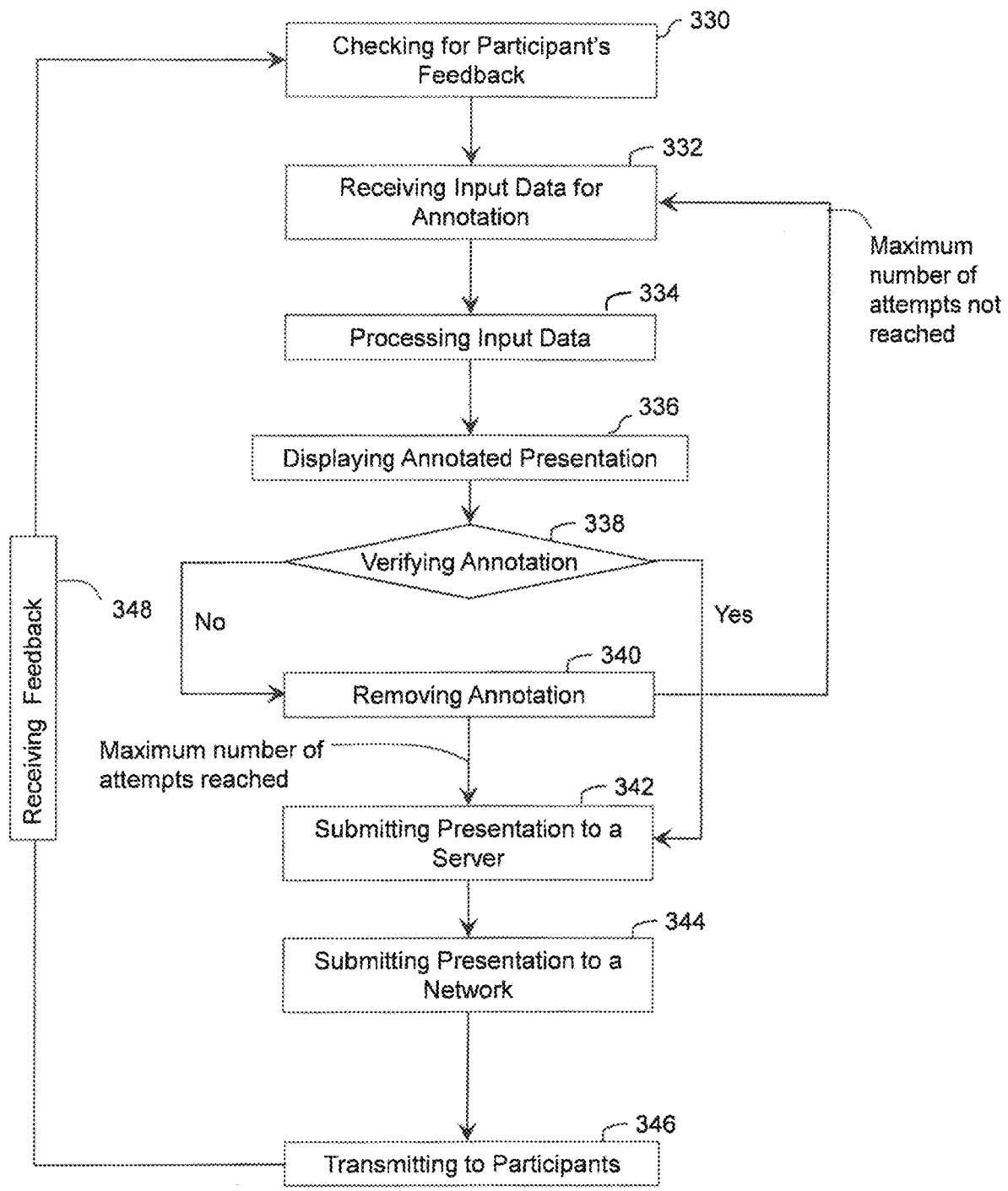
FIG. 8 is a flowchart of an example process for annotating a presentation, in accordance with embodiments of the present disclosure.

FIG. 8 depicts a flowchart representing participants interacting with the multimedia conferencing system. The multimedia conferencing system may be configured to receive annotations from participants such as annotations from a presenter and/or an attendee. In step 330, the multimedia conferencing system may be configured to check for participants' feedback prior to annotating portions of multimedia content. The feedback from a participant may influence a presenter to alter the annotations for portions of the multimedia content.

In step 332, the multimedia conferencing system may receive an input data for annotations from a presenter and processes the input data. The input data for annotation from a presenter may include a voice audio signal, a hand gesture, a head gesture, a pointing with a laser pointer, and/or the like. In step 334, the input data may be processed by an artificial intelligence system configured to analyze the voice audio signal and the visual gestures of a presenter to select a portion of multimedia content that might require an annotation.

In some embodiments, the voice audio signal or the visual gestures may be processed by the artificial intelligence system to determine a type of annotation requested by a presenter. In an example embodiment, the artificial intelligence system may be configured to parse the multimedia content and identify text within the multimedia content. The artificial intelligence system may also be configured to transcribe the voice data associated with the presenter's speech, compare transcribed words of the presenter's speech with the text identified within the multimedia content, and annotate portions of the multimedia content that contain words or text patterns that match words or text patterns found in the presenter's speech. In some embodiments, the multimedia conferencing system may be configured to use an artificial intelligence functionality to identify graphics within the multimedia content and associate the graphics with words from the presenter's speech. In an illustrative embodiment, the artificial intelligence system may include a neural network or a recurrent neural network. In some illustrative embodiments, the artificial intelligence system may include ensemble learning method such as random decision forests for data classification and data regression.

In step 336, the multimedia conferencing system may display the annotated portions to a presenter using, for example a display module, for displaying annotated presentation. The multimedia conferencing system may be configured to allow a presenter to verity annotations for portions of the multimedia content in step 338 prior to submitting the annotations to a conferencing server in step 342. If the annotations selected by the system for processing input data are not satisfactory to a presenter, the multimedia conferencing system may be configured to remove the annotations in step 340 and check if the maximum number of attempts at annotating portions of the multimedia content has been reached. The maximum number of attempts may be any number greater than zero that a presenter may select. If the maximum number of attempts is reached, the multimedia conferencing system may be configured to remove all the annotations and submit presentation to the conferencing server without any annotations. The multimedia conferencing system may be configured to require the conferencing server to submit the presentation to a network, in step 344, and to transmit the presentation to participants in step 346.

Figure 9:
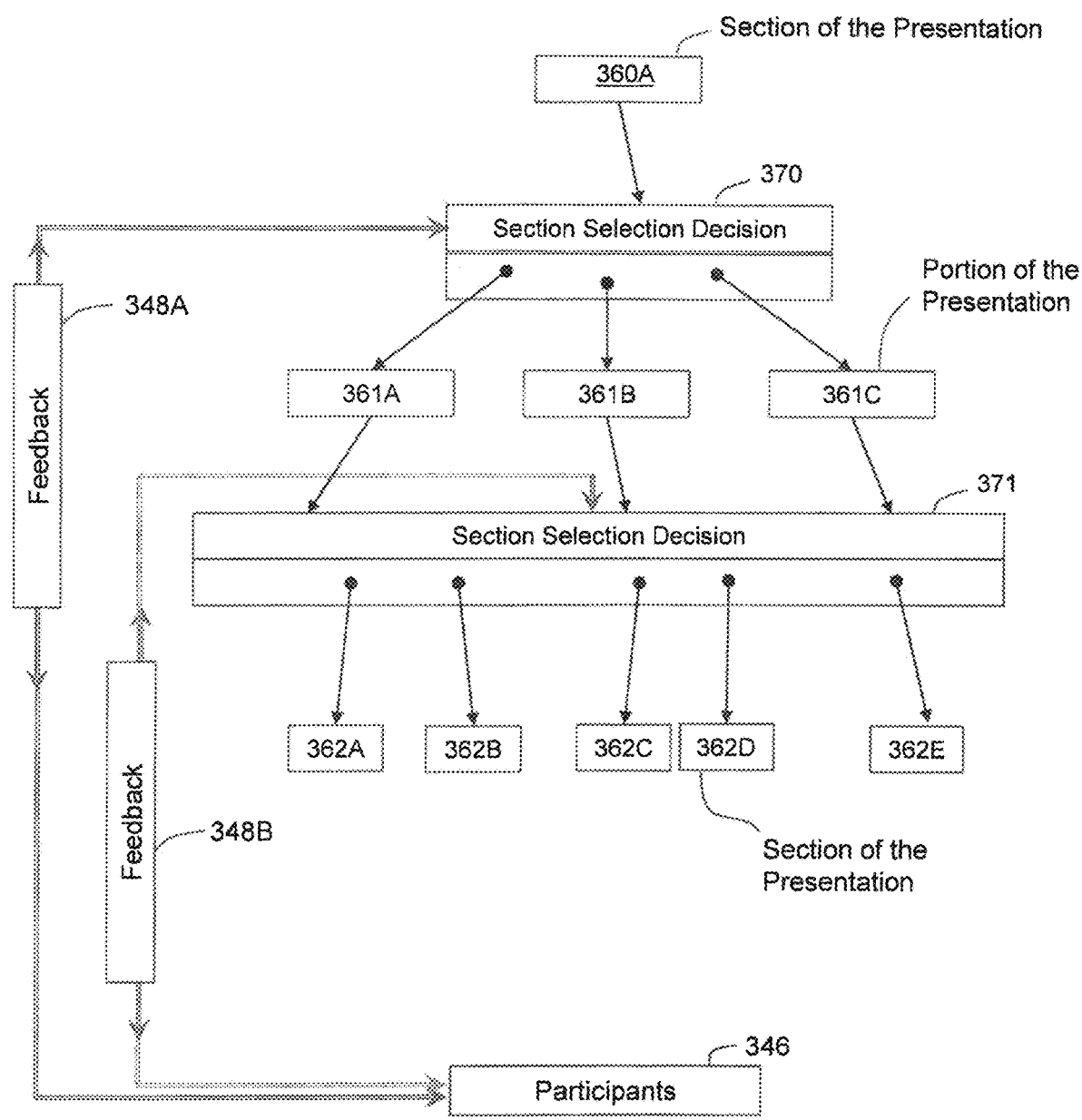
FIG. 9 shows an example presentation flow diagram, in accordance with embodiments of the present disclosure.

According to illustrative embodiments, the multimedia conferencing system may be configured to allow a presenter to present a section of the presentation including annotations to portions of multimedia content. After each presented section, a presenter may inquire what section of the presentation should be presented next. In various embodiments, a presenter may prepare various presentation sections and arrange the flow of presentation based on a feedback from participants. In various embodiments, a presenter may prepare a set of annotated portions of multimedia content, and participants may select a next presentation section related to one of the annotated portions. FIG. 9 shows an illustrative flowchart describing a possible flow of presentation subject to a feedback from participants. In an example embodiment, a presenter may show a first section 360A of the presentation. The multimedia conferencing system may be configured to receive a first feedback 348A from participants 346 and, based on the feedback, select the next section of the presentation using section selection decision process 370. For example, the participants may vote for a detailed explanation for a particular portion of the presentation and the portion may be further expanded resulting in the next section of the presentation. For example, if participants select a portion corresponding to a presentation section 361A, the details of such presentation section may be further presented. Alternatively, if participants select presentation section 361B or 361C the details of that presentation section may be further presented. FIG. 9 shows that the multimedia conferencing system may be configured to receive a second feedback 348B from participants 346 following the presentation of one of the sections 361A-361C and, based on the feedback, select a next section of the presentation using section selection decision process 371. As shown in FIG. 9, participants may choose to select next available presentation sections 362A-362E.

Various types of responses from participants may be used to select the next section of the presentation. For example, a participant may ask questions about a portion of the presentation, or a participant may indicate interest or importance of a portion of the presentation resulting in selecting a section that corresponds to details for the annotated portion.

Figure 10:
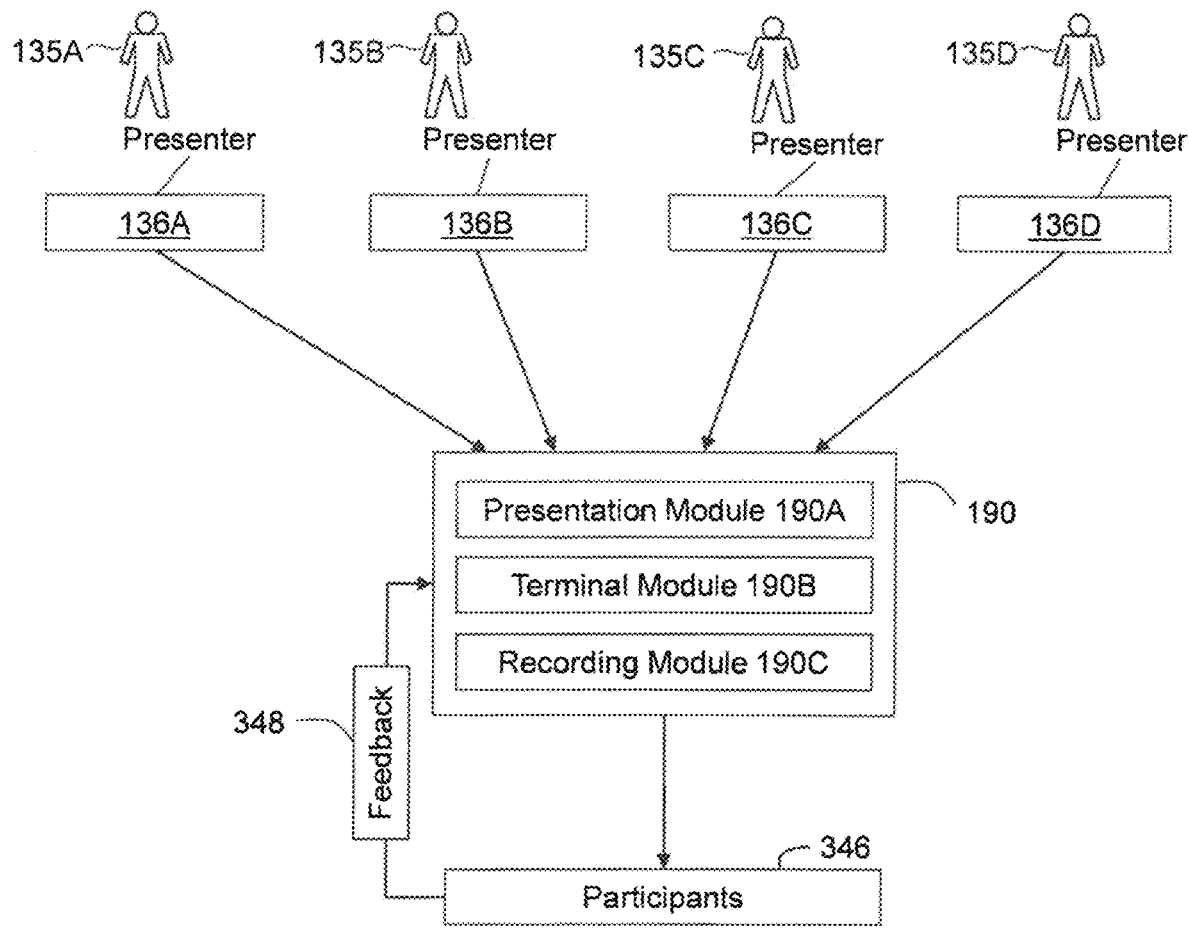
FIG. 10 shows an example process for combining several presentations from multiple presenters, in accordance with embodiments of the present disclosure.

FIG. 10 shows an illustrative embodiment of the multimedia conferencing system where several presenters 135A-135D may be members of a panel of presenters. In some embodiments, each presenter may present one or more sections of the presentation. In various embodiments, using their corresponding devices 136A-136D, the presenters 135A-135D may transmit their sections of the presentation to a Conference Multimedia Presentation System 190 including the presentation module 190A, terminal module 190E and the recording module 190C. In some embodiments, the first presenter presents a first section of the presentation, including annotated portions of multimedia content. The participants 346 may vote on the next section corresponding to annotated portions of the multimedia content using participant's feedback 348. The next section of the presentation may be presented by the same or different presenter chosen from the panel of presenters. During the presentation all the participants, including panel members that are not currently presenting, may engage in group discussion as shown, for example, in FIG. 5, where each participant may annotate an annotation 230A of the presented multimedia content.

Figure 11:
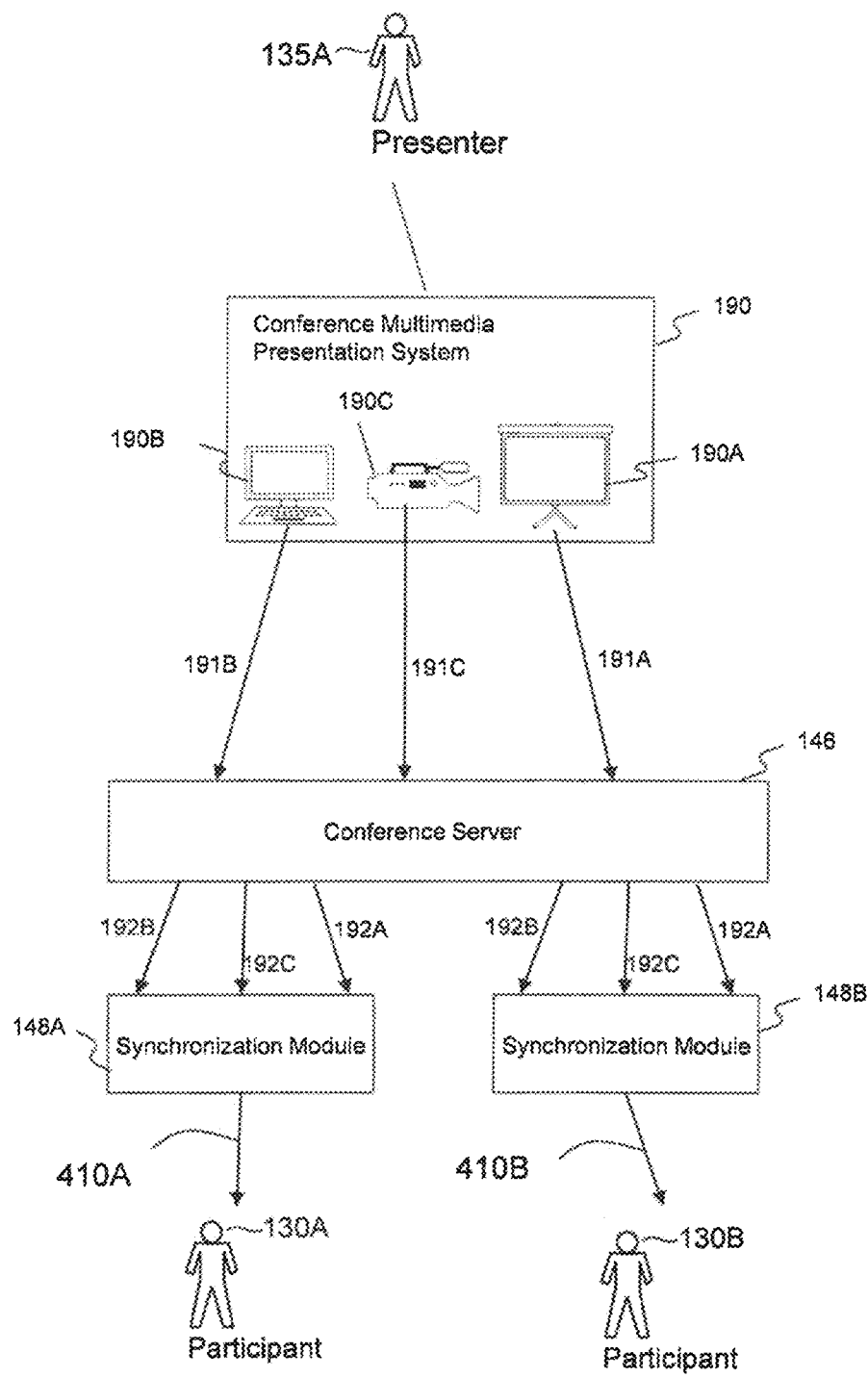
FIG. 11 shows an example process for synchronizing different parts of the presentation for a participant, in accordance with embodiments of the present disclosure.

FIG. 11 shows the Conference Multimedia Presentation System 190 interacting with the conferencing server 146. In an illustrative embodiment, the Conference Multimedia Presentation System 190 may communicate the presentation data including slides, video, and audio data to the conferencing server through data connections 191A-191C. In various embodiments, the presentation module 190A may communicate through the data connection 191A, the terminal module 190B may communicate through the data connection 191B, and the recording module 190C may communicate through the data connection 191C. The conferencing server 146 may separate the presentation data according to different network connections 410A, and 410B to be communicated to participants 130A and 130B respectively. Each network may communicate the presentation data to a participant through data connections 192A-192C. For example, the multimedia content of the presentation may be communicated through a data connection 192A, the annotation data and user comments may be communicated through a data connection 192B, and the video data may be communicated through a data connection 192C. The data in data connections 192A-192D may be synchronized, using the synchronization module 148A for network connection 410A and the synchronization module 148B for network connection 410B, in order to deliver a coherent synchronized presentation to a corresponding participant 130A and 130B. In alternative embodiments, when network associated with a participant may not have a sufficient bandwidth for a real-time synchronization of all the data, the data may be modified to minimize incoherence of the presentation. In an embodiment, the video data may not be transmitted, and the audio data may be transcribed and transmitted as a run-time text stream. Depending on bandwidth of the network for different participants, different synchronization approaches may be used for different participants.

In various embodiments the multimedia conferencing system may include a memory device storing instructions; a processor configured to execute the instructions to receive, in real time, annotations for portions of multimedia content and to communicate to a participant device, the multimedia content including the annotations, through a network connection. In various embodiments, the multimedia conferencing system may include a software application with a user interface for manipulating the annotated portions of the multimedia content by a participant device based on a set of associated characteristics. The multimedia conferencing system may have a plurality of the network connections corresponding to a plurality of the participant devices, as shown, for example in FIG. 11 by connections 410A and 410B. In various embodiments, each network connection may have a set of associated attributes. The term "attributes" when applied to network connections, may refer to properties of the network connection. Such properties may, for example, include a bandwidth of the network, network security level, and reliability of the network.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A multimedia conferencing method enabling communication among a set of participants including a presenter, the method comprising:
   receiving, from the presenter in real time, an annotation for a portion of multimedia content, wherein the annotated portion of the multimedia content has a set of associated characteristics for manipulating the portion of the multimedia content;
   permitting, in response to a received request from a non-presenting presenter, manipulation of the annotated portion of the multimedia content based on the set of the associated characteristics, wherein the manipulation is one of copying or sharing the annotated portion of the multimedia content by the non-presenting participant;
   recording the manipulation of the annotated portion of the multimedia content; and
   providing feedback to the presenter based on the recorded manipulation, wherein the feedback reflects conference participant comment or the manipulation of the annotated portion of the multimedia content.

2. The method of claim 1, wherein the annotation for a portion of multimedia content comprises a tag being an audio data not accessible to a participant.

3. The method of claim 2, further comprising:
using artificial intelligence functionality, detecting information in a presenter's speech related to the tags associated with portions of the multimedia content; and
selecting the portion of the multimedia content associated with a tag for receiving, the annotation.

4. The method of claim 2, further comprising:
using artificial intelligence functionality, detecting information in a presenter's speech related to a way to annotate the portion of the multimedia content.

5. The method of claim 1, wherein providing feedback about portions that were manipulated comprises:
providing the feedback to a presenter from participants, the feedback being calculated statistical information related to manipulations of the annotated portion of the multimedia content by the participants.

6. The method of claim 5, further comprising:
in response to the feedback from the participants, changing a flow of a presentation.

7. The method of claim 5, further comprising:
in response to the feedback from the participants, modifying the annotation for the portion of the multimedia content.

8. The method of claim 1, further comprising:
forming a group between participants for sharing one or more annotated portions of the multimedia content using a group discussion system, the group discussion system configured to support a group chat allowing the participants of the group to interact with one another and discuss the annotated portions.

9. The method of claim 1, further comprising:
receiving a first annotated portion of the multimedia content, the first annotated portion having a first set of associated characteristics, the first annotated portion shared with a first set of participants; and
receiving a second annotated portion of the multimedia content, the second annotated portion having a second set of associated characteristics, the second annotated portion shared with a second set of participants;
wherein, the second set of associated characteristics being different from the first set of the associated characteristics; and
wherein at least one participant from the first set of participants is different from at least another participant from the second set of participants.

10. The method of claim 9, further comprising:
permitting the manipulation of the first annotated portion by a first participant from the first set of participants; and
permitting the manipulation of the second annotated portion by a second participant from the second set of participants.

11. A multimedia conferencing system comprising:
a memory device storing instructions; and
a processor configured to:
annotate a portion of multimedia content, wherein the annotated portion of the multimedia content has a set of associated characteristics for manipulating the portion of the multimedia content;
detect an event during a conferencing session, wherein the event corresponds to a predetermined number of participants having a similar comment;
share the annotated portion of the multimedia content based on the detected event; and
manipulate the shared portion of the multimedia content based on the set of the associated characteristics.

12. The system of claim 11, wherein the processor is further configured to:
annotate the portion of the multimedia content by a participant; and
share the information related to the annotated portion of the multimedia content with a presenter.

13. The system of claim 12, wherein the multimedia content comprises a first part being an audio signal, and a second part being a presentation content.

14. The system of claim 13, wherein the processor is further configured to:
use an artificial intelligence functionality to detect information in the audio signal; and
annotate the portion of the second part of the multimedia content corresponding to the information detected in the audio signal.

15. The system of claim 11, wherein the processor is further configured to:
communicate the multimedia content containing the annotated portion to a network.

16. The system of claim 11, wherein the processor is further configured to:
manipulate annotated portion of the multimedia content by at least one of copying the annotated portion of the multimedia content, highlighting the annotated portion of the multimedia content, liking the annotated portion of the multimedia content, agreeing with the annotated portion of the multimedia content, viewing the annotated portion of the multimedia content, questioning the annotated portion of the multimedia content, commenting on the annotated portion of the multimedia content, annotating the multimedia content, exporting the annotated portion of the multimedia content or sharing the annotated portion of the multimedia content.

17. The system of claim 11, wherein the processor is further configured to:
receive feedback on the annotated portions of the multimedia content.

18. A multimedia conferencing system comprising:
a memory device storing instructions; and
a processor configured to execute the instructions to perform a method, the method comprising:
receiving, in real time, comments from participants, the comments comprising annotations for portions of multimedia content;
calculating statistics of the comments from participants;
reporting a number of comments related to a particular topic;
depending on the contents of the comments from the participants, receiving, in real time, annotations for portions of multimedia content; and
manipulating the portions of the multimedia content through a user interface of the participant device based on a set of associated characteristics.

19. The system of claim 18, further comprising a plurality of the network connections corresponding to a plurality of the participant devices, each network connection having a set of associated attributes.

20. The system of claim 19, wherein manipulating the portions of the multimedia content includes exchanging at least some of the portions of the multimedia content between the participant devices.

* * * * *